US012370103B2

(12) United States Patent
Ponsi et al.

(10) Patent No.: US 12,370,103 B2
(45) Date of Patent: Jul. 29, 2025

(54) APPARATUS AND SYSTEM FOR TURNING AND POSITIONING A PATIENT

(71) Applicant: Sage Products, LLC, Cary, IL (US)

(72) Inventors: Larry Ponsi, Wheeling, IL (US); James Layer, Cary, IL (US)

(73) Assignee: Sage Products, LLC, Cary, IL (US)

( * ) Notice: Subject to any disclaimer, the term of this patent is extended or adjusted under 35 U.S.C. 154(b) by 0 days.

(21) Appl. No.: 18/087,526

(22) Filed: Dec. 22, 2022

(65) Prior Publication Data

US 2023/0126051 A1 Apr. 27, 2023

Related U.S. Application Data

(63) Continuation of application No. 17/138,399, filed on Dec. 30, 2020, now Pat. No. 11,744,752, which is a (Continued)

(51) Int. Cl.

*A61G 7/00* (2006.01)
*A61G 7/05* (2006.01)
*A61G 7/10* (2006.01)

(52) U.S. Cl.

CPC ........... *A61G 7/001* (2013.01); *A61G 7/0509* (2016.11); *A61G 7/0514* (2016.11); *A61G 7/10* (2013.01);

(Continued)

(58) Field of Classification Search

CPC ..... A61F 5/485; A61G 7/1023; A61G 7/1025; A61G 7/1026; A61G 7/001; A61G 7/0509; A61G 7/0514; A61G 7/0525; A61G 7/10

See application file for complete search history.

(56) References Cited

U.S. PATENT DOCUMENTS

| | | | | |
|---|---|---|---|---|
| 1,334,901 | A | 3/1920 | Higdon | |
| 2,779,035 | A * | 1/1957 | McMurry | A47G 9/0238 5/925 |

(Continued)

FOREIGN PATENT DOCUMENTS

| | | |
|---|---|---|
| CA | 2765604 | 7/2012 |
| DE | 10 2010 007 457 | 8/2011 |

(Continued)

OTHER PUBLICATIONS

ES-2156919-T5 Eng translation (Year: 1996).*

(Continued)

*Primary Examiner* — Justin C Mikowski
*Assistant Examiner* — Amanda L Bailey
(74) *Attorney, Agent, or Firm* — FOLEY & LARDNER LLP

(57) ABSTRACT

A system for use with a bed having a frame and a supporting surface includes a sheet having a bottom surface placed above the supporting surface of the bed, a top surface, and a plurality of tether straps connected to and extending from the sheet. Each tether strap is configured for connection to the bed. The bottom surface is at least partially formed of a low friction material, and the top surface is at least partially formed of a high friction material, such that the top surface provides greater slipping resistance than the bottom surface. The tether straps include at least two pairs of tether straps, with one pair connected proximate a top edge of the sheet and another pair connected proximate a bottom edge of the sheet. The sheet may further include a sliding member on the bottom surface to assist in lateral sliding of the sheet.

16 Claims, 11 Drawing Sheets

Related U.S. Application Data continuation of application No. 15/221,098, filed on Jul. 27, 2016, now Pat. No. 10,881,565, which is a continuation of application No. 13/838,952, filed on Mar. 15, 2013, now Pat. No. 9,414,977, which is a continuation-in-part of application No. 13/014,497, filed on Jan. 26, 2011, now Pat. No. 8,850,634, and a continuation-in-part of application No. 13/014,500, filed on Jan. 26, 2011, now Pat. No. 8,789,533.

(52) U.S. Cl.
CPC ......... *A61G 7/1023* (2013.01); *A61G 7/1026* (2013.01); *A61G 7/0525* (2013.01)

(56) References Cited

U.S. PATENT DOCUMENTS

| | | | | |
|---|---|---|---|---|
| 3,333,286 | A | 8/1967 | Biolik | |
| 3,452,372 | A | 7/1969 | Emery | |
| 3,792,500 | A | 2/1974 | Swara, Sr. | |
| 3,829,914 | A * | 8/1974 | Treat | A61G 7/1026 5/81.1 T |
| 3,965,503 | A | 6/1976 | Gridel | |
| 4,021,870 | A * | 5/1977 | Walters | A61F 5/485 5/495 |
| 4,048,681 | A | 9/1977 | Baulch et al. | |
| 4,214,326 | A | 7/1980 | Spann | |
| 4,233,700 | A | 11/1980 | Spann | |
| 4,391,010 | A | 7/1983 | Kronman | |
| 4,662,016 | A | 5/1987 | Seeman | |
| 4,675,925 | A * | 6/1987 | Littleton | A61G 7/1023 5/607 |
| 4,802,249 | A | 2/1989 | Bills | |
| 4,858,625 | A | 8/1989 | Cramer | |
| 4,934,002 | A * | 6/1990 | Watanabe | A61G 7/008 5/607 |
| 5,138,731 | A * | 8/1992 | Harcrow, Jr. | A61G 7/0527 5/89.1 |
| 5,182,828 | A | 2/1993 | Alivizatos | |
| 5,193,238 | A | 3/1993 | Clute | |
| 5,280,657 | A * | 1/1994 | Stagg | A61G 7/1026 5/81.1 R |
| 5,329,655 | A | 7/1994 | Garner | |
| 5,448,790 | A | 9/1995 | Saro et al. | |
| RE35,468 | E | 3/1997 | Newman | |
| 5,701,617 | A * | 12/1997 | Colby | A47C 27/006 5/923 |
| 6,154,900 | A | 12/2000 | Shaw | |
| 6,496,991 | B1 | 12/2002 | Votel | |
| 6,560,793 | B2 | 5/2003 | Walker | |
| 6,658,676 | B1 * | 12/2003 | Persson | A61G 7/103 5/81.1 HS |
| 6,666,426 | B1 | 12/2003 | Taylor | |
| 6,804,845 | B2 | 10/2004 | Stewart et al. | |
| 6,874,176 | B2 | 4/2005 | Berge | |
| 7,171,710 | B2 * | 2/2007 | Mann | A47D 15/003 5/655 |
| 7,240,384 | B2 | 7/2007 | Dudonis | |
| 7,506,387 | B1 | 3/2009 | Scordato et al. | |
| 7,571,498 | B2 | 8/2009 | Jewell et al. | |
| 7,676,862 | B2 | 3/2010 | Poulos et al. | |
| 7,836,528 | B2 * | 11/2010 | Nuckton | A47G 9/0238 5/81.1 HS |
| 7,849,533 | B1 * | 12/2010 | Receveur | A47G 9/0246 5/81.1 R |
| 8,161,583 | B1 * | 4/2012 | Palen | A61G 7/1026 5/81.1 HS |
| 8,789,533 | B2 | 7/2014 | Steffens et al. | |
| 2001/0040402 | A1 | 11/2001 | Odderson | |
| 2002/0029417 | A1 | 3/2002 | Walker | |
| 2003/0124928 | A1 * | 7/2003 | Sherrod | A47C 27/006 442/79 |
| 2004/0060113 | A1 | 4/2004 | Lantagne | |
| 2004/0163176 | A1 | 8/2004 | Berge | |
| 2005/0005358 | A1 | 1/2005 | Dudonis | |
| 2005/0034239 | A1 * | 2/2005 | Mann | A47D 15/008 5/660 |
| 2005/0055768 | A1 | 3/2005 | Assink | |
| 2005/0229314 | A1 | 10/2005 | Chisari | |
| 2006/0150322 | A1 | 7/2006 | Schrepfer | |
| 2006/0213010 | A1 | 9/2006 | Davis | |
| 2008/0209630 | A1 * | 9/2008 | Kazala | A61G 1/01 5/81.1 T |
| 2010/0257703 | A1 | 10/2010 | Vass | |
| 2011/0072579 | A1 | 3/2011 | Receveur et al. | |
| 2011/0304186 | A1 | 12/2011 | Andrews | |
| 2012/0010051 | A1 * | 1/2012 | Bruschke | A63B 22/20 482/51 |
| 2012/0186587 | A1 | 7/2012 | Steffens et al. | |
| 2013/0205495 | A1 | 8/2013 | Ponsi et al. | |
| 2013/0270881 | A1 | 10/2013 | Fowler et al. | |
| 2014/0304918 | A1 | 10/2014 | Steffens et al. | |

FOREIGN PATENT DOCUMENTS

| | | | | |
|---|---|---|---|---|
| EP | 1166740 | A2 * | 1/2002 | A61G 1/00 |
| ES | 2156919 | T5 * | 8/2001 | A61F 13/15203 |
| FR | 2923367 | A1 | 5/2009 | |
| GB | 2 300 845 | A | 11/1996 | |
| JP | 10-117907 | A | 5/1998 | |
| WO | WO-88/10082 | A1 | 12/1988 | |
| WO | WO-96/27357 | A1 | 9/1996 | |
| WO | WO-02/065877 | A1 | 8/2002 | |
| WO | WO-2004/050002 | A1 | 6/2004 | |
| WO | WO-2005/107673 | A1 | 11/2005 | |
| WO | WO-2012/170934 | A2 | 12/2012 | |
| WO | WO-2015/081233 | A1 | 6/2015 | |
| WO | WO-2017/185039 | A2 | 10/2017 | |
| WO | WO-2019/060424 | A1 | 3/2019 | |
| WO | WO-2020/041493 | A1 | 2/2020 | |

OTHER PUBLICATIONS

Dec. 4, 2012—(WO) International Search Report and Written Opinion—App PCT/US2012/041729, 15 pages.
Dec. 10, 2013—International Preliminary Report on Patentability—App PCT/US2012/041729, 8 pages.
Dec. 31, 2013—(US) Final Office Action—U.S. Appl. No. 13/014,497.
Jul. 12, 2013—(WO) International Search Report and Written Opinion—App PCT/US2013/036448, 9 pages.
Jul. 2, 2013—(US) Non-Final Office Action—U.S. Appl. No. 13/014,497.
Mar. 20, 2013—(US) Non-Final Office Action—U.S. Appl. No. 13/014,500.
Mar. 28, 2014—(US) Non-Final Office Action—U.S. Appl. No. 13/156,103.
May 15, 2014—(WO) International Search Report and Written Opinion—App PCT/US12/22572, 25 pages.
Nov. 28, 2014—(EP) Search Report—App 14159820.1.
Jun. 25, 2015—(EP) Extended Search Report—App 12739957.4.
May 15, 2015—(WO) International Search Report and Written Opinion—App PCT/US2014/067672.
Sep. 14, 2015—(US) Non-Final Office Action—U.S. Appl. No. 13/838,952.
Communication pursuant to Article 94(3) EPC for EP Application No. 12728152.5 date Apr. 22, 2015, 5 pages.
Communication pursuant to Article 94(3) EPC for EP Application No. 12739957.4 dated Mar. 14, 2016, 6 pages.
Extended European Search Report for EP App. No. 17150121.6, dated Mar. 28, 2017, 6 pages.
Prism Medical Company, 5300 Ergoglide Instructions, 2009, 2 pp. Maryland Heights, MO.
Textbook of Palliative Nursing, Nov. 10, 2005, Oxford University Press, XP002740850, 1 page.

(56) References Cited

OTHER PUBLICATIONS

Waverley Glen, One-Way Glide—The Grimstead Range of Transfer and Repositioning Aids, Ontario Canada, downloaded Jun. 11, 2012, 3 pages.

* cited by examiner

FIG. 3
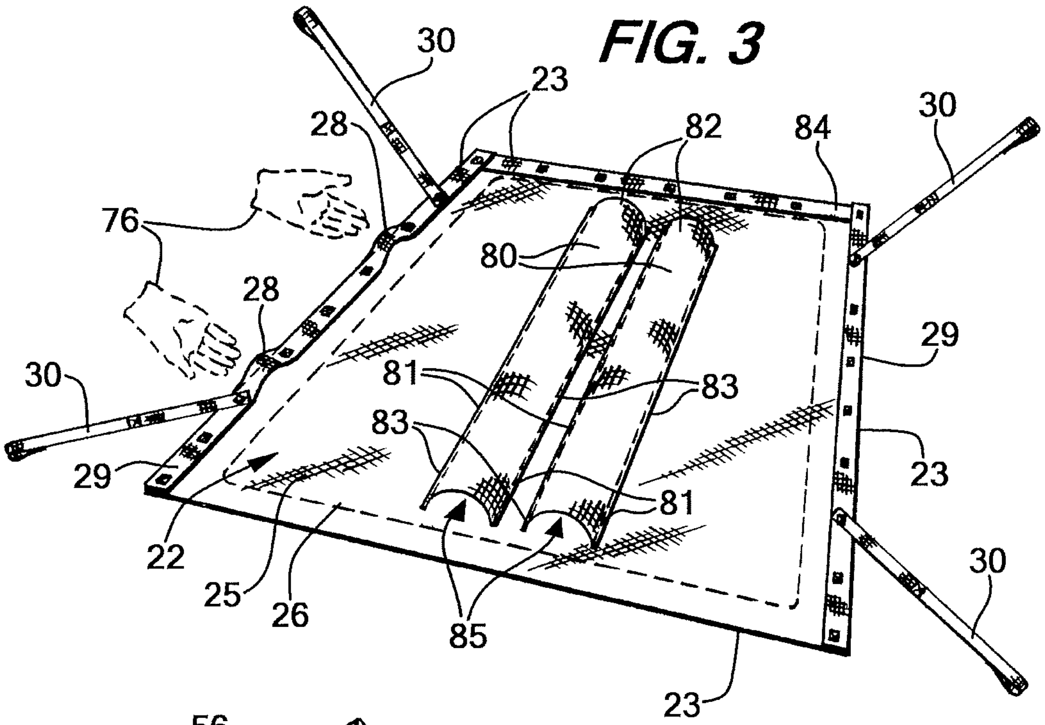
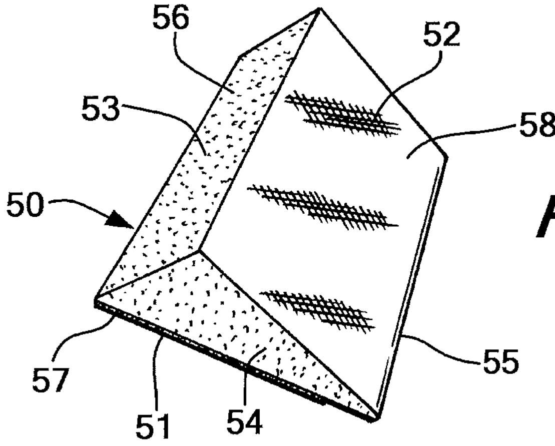
FIG. 4
FIG. 5
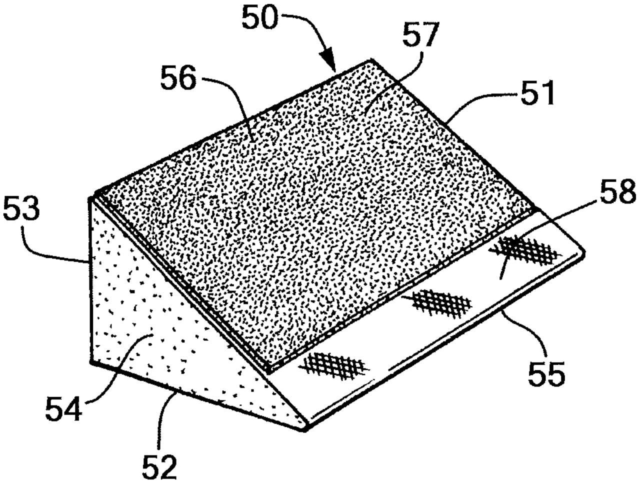

APPARATUS AND SYSTEM FOR TURNING AND POSITIONING A PATIENT

CROSS-REFERENCE TO RELATED PATENT APPLICATIONS

This is a continuation of U.S. patent application Ser. No. 17/138,399 filed Dec. 30, 2020, which is a continuation of U.S. patent application Ser. No. 15/221,098, filed Jul. 27, 2016, which is a continuation of U.S. patent application Ser. No. 13/838,952, filed Mar. 15, 2013, which is a continuation-in-part of U.S. patent application Ser. No. 13/014,497, filed Jan. 26, 2011 and U.S. patent application Ser. No. 13/014,500, filed Jan. 26, 2011. All of the foregoing patent applications are incorporated herein by reference in their entireties.

TECHNICAL FIELD

The present invention generally relates to an apparatus, system, and method for turning and positioning a person supine on a bed or the like, and, more particularly, to a sheet having a gripping surface, a slipping surface, an absorbent pad, and/or a wedge for use in turning and positioning a supine person, as well as systems and methods including one or more of such apparatuses.

BACKGROUND

Nurses and other caregivers at hospitals, assisted living facilities, and other locations often care for bedridden patients that have limited or no mobility, many of whom are critically ill or injured. These immobile patients are at risk for forming pressure ulcers (bed sores). Pressure ulcers are typically formed by one or more of several factors. Pressure on a patient's skin, particularly for extended periods of time and in areas where bone or cartilage protrudes close to the surface of the skin, can cause pressure ulcers. Frictional forces and shearing forces from the patient's skin rubbing or pulling against a resting surface can also cause pressure ulcers. Excessive heat and moisture can cause the skin to be more fragile and increase the risk for pressure ulcers. One area in which pressure ulcers frequently form is on the sacrum, because a patient lying on his/her back puts constant pressure on the sacrum, and sliding of the patient in a bed can also cause friction and shearing at the sacrum. Additionally, some patients need to rest with their heads inclined for pulmonary reasons, which can cause patients to slip downward in the bed and cause further friction or shearing at the sacrum and other areas. Existing devices and methods often do not adequately protect against pressure ulcers in bedridden patients, particularly pressure ulcers in the sacral region.

One effective way to combat sacral pressure ulcers is frequent turning of the patient, so that the patient is resting on one side or the other, and pressure is taken off of the sacrum. Pillows that are stuffed partially under the patient are often use to support the patient's body in resting on their left or right sides. A protocol is often used for scheduled turning of bedridden patients, and dictates that patients should be turned Q2, or every two hours, either from resting at a 30° angle on one side to a 30° angle on the other side, or from 30° on one side to 0°/supine (lying on his/her back) to 30° on the other side. However, turning patients is difficult and time consuming, typically requiring two or more caregivers, and can result in injury to caregivers from pushing and pulling the patient's weight during such turning. As a result, ensuring compliance with turning protocols, Q2 or otherwise, is often difficult. Additionally, the pillows used in turning and supporting the patient are non-uniform and can pose difficulties in achieving consistent turning angles, as well as occasionally slipping out from underneath the patient.

The present invention seeks to overcome certain of these limitations and other drawbacks of existing devices, systems, and methods, and to provide new features not heretofore available.

BRIEF SUMMARY

The present invention relates generally to systems for turning and positioning persons in a supine position, such as a patient in a hospital bed. Aspects of the invention relate to a device or system for use with a bed having a frame and a supporting surface supported by the frame. The system includes a sheet having a bottom surface adapted to be placed above the supporting surface of the bed and a top surface opposite the bottom surface, and a plurality of tether straps connected to the sheet and extending from the sheet, each tether strap being configured for connection to the bed. The bottom surface is at least partially formed of a first material having a first coefficient of friction, and the top surface is at least partially formed of a second material having a second coefficient of friction, and wherein the second coefficient of friction is higher than the first coefficient of friction such that the top surface provides greater slipping resistance than the bottom surface. The plurality of tether straps include at least first and second pairs of tether straps, the first pair of tether straps connected proximate a top edge of the sheet and the second pair of tether straps connected proximate a bottom edge of the sheet opposite the top edge.

According to one aspect, the system further includes a wedge having a base wall, a ramp surface, and a back wall, with the ramp surface being positioned at an angle to the base wall. The wedge is configured to be positioned under the sheet such that the base wall confronts the supporting surface of the bed and the ramp surface confronts the bottom surface of the sheet. The wedge may further include a wedge body formed at least partially of a compressible material and defining the base wall, the ramp surface, and the back wall, and the wedge may have a low friction material positioned on the ramp surface and a high friction foam material positioned on the base wall. The high friction foam material is adapted to resist sliding of the base wall with respect to the supporting surface of the bed. The system may further include a second, similarly configured wedge.

According to another aspect, each tether strap comprises an elastic portion forming at least a portion of a length of the tether strap. Each tether strap may also include a non-elastic portion forming a portion of the length of the tether strap. In this configuration, the elastic portion may be connected at one end to the sheet and at the other end to the non-elastic portion, and the non-elastic portion is configured for connection to the bed. The non-elastic portion may have a hook-and-loop connecting structure configured to permit the non-elastic portion to connect to itself in a loop, such that a connecting member on the bed is received in the loop to connect the tether strap to the bed.

According to a further aspect, the system may include a fastener configured for attachment to the bed, where the fastener includes an engagement member configured to be engaged by one of the tether straps to connect the tether strap to the bed.

According to yet another aspect, the system also includes a sliding member formed of a low friction material and connected to the bottom surface of the sheet to assist in lateral sliding of the sheet. The sliding member has a fixed portion that is fixed to the bottom surface of the sheet and a free portion that is moveable over a range of movement with respect to the bottom surface of the sheet along a lateral direction extending between side edges of the sheet. At least a portion of the bottom surface of the sheet is configured to slide against the sliding member within the range of movement of the sliding member when the sheet is moved along the lateral direction. The low friction material of the sliding member may be the same as the first material of the sheet.

According to still further aspects, the first pair of tether straps are connected to opposed side edges of the sheet proximate the top edge, and the second pair of tether straps are connected to the opposed side edges of the sheet proximate the bottom edge.

Additional aspects of the invention relate to a device or system for use with a bed having a frame and a supporting surface supported by the frame. The system includes a sheet having a bottom surface adapted to be placed above the supporting surface of the bed and a top surface opposite the bottom surface, and a sliding member formed of a low friction material and connected to the bottom surface of the sheet. The bottom surface of the sheet has a low friction surface forming at least a portion of the bottom surface, and the top surface has a high friction surface forming at least a portion of the top surface, such that the top surface provides greater slipping resistance than the bottom surface. The sheet further has a top edge configured to be positioned proximate a head of the bed, a bottom edge configured to be positioned proximate a foot of the bed, and opposed side edges located between the top and bottom edges. The sliding member has a fixed portion that is fixed to the bottom surface of the sheet and a free portion that is moveable over a range of movement with respect to the bottom surface of the sheet along a lateral direction extending between the side edges. At least a portion of the bottom surface of the sheet is configured to slide against the sliding member within the range of movement of the sliding member when the sheet is moved along the lateral direction, to facilitate lateral movement of the sheet.

According to one aspect, the sliding member is formed of a sheet of flexible material connected to the bottom surface of the sheet along a longitudinal direction extending between the top and bottom edges. The sheet of flexible sheet material may be formed in a tubular structure, where the tubular structure has a central passage aligned with the longitudinal direction. The sliding member may be connected to the bottom surface of the sheet along at least one connection line extending along the longitudinal direction. For example, the sliding member may be connected to the bottom surface of the sheet along a first connection line and a second connection line spaced from the first connection line, where the first and second connection lines extend along the longitudinal direction.

According to another aspect, the low friction surface on the bottom surface of the sheet is formed of the same low friction material as the sliding member.

According to a further aspect, a plurality of tether straps may be connected to the sheet and extend from the sheet, each tether strap being configured for connection to the bed. The plurality of tether straps include at least first and second pairs of tether straps, the first pair of tether straps connected proximate the top edge and the second pair of tether straps connected proximate the bottom edge.

According to yet another aspect, the system also includes a second sliding member that may have a similar construction to the sliding member described above. The two sliding members may be substantially parallel to each other. The first and second sheets of flexible material may each be formed in a tubular structure having a central passage aligned with the longitudinal direction, such that the central passages of the two sliding members are substantially parallel. Additionally, the sliding member may be connected to the bottom surface of the sheet along at least one first connection line extending along the longitudinal direction, and the second sliding member is connected to the bottom surface of the sheet along at least one second connection line extending along the longitudinal direction, such that the first and second central connection lines are substantially parallel.

Further aspects of the invention relate to a method of using a system as described above, with a sheet including a plurality of tether straps for connection to the bed. The sheet is placed on the bed, and the straps are connected, then an absorbent pad is placed into contact with the top surface of the sheet, where the second material resists sliding of the pad with respect to the top surface, due to the second coefficient of friction being higher. A patient is then positioned above the supporting surface of the mattress, such that the supporting surface supports the patient and at least a portion of the patient rests on the absorbent pad. Both pairs of tether strap are connected to the bed proximate the head of the bed and connecting the second pair of tether straps to the bed proximate the foot of the bed. Additionally, a wedge is placed at least partially underneath the sheet, the wedge having a base wall, a ramp surface positioned at an angle to the base wall to form an apex, and a back wall opposite the apex, by inserting the apex of the wedge underneath an edge of the sheet from the first side of the bed such that the base wall confronts the supporting surface of the mattress and the ramp surface confronts the bottom surface of the sheet. The sheet is then moved toward the back wall of the wedge to slide the patient and at least a portion of the sheet at least partially up the ramp surface of the wedge, such that the ramp surface of the wedge partially supports the patient, to cause the patient to lie in an angled position. A second wedge configured similarly to the original wedge would work as well.

According to one aspect, each of the tether straps includes an elastic portion forming at least a portion of a length of the tether strap. Each of the tether straps may also include a non-elastic portion forming a portion of the length of the tether strap, where the elastic portion is connected at one end to the sheet and the elastic portion is connected at the other end to the non-elastic portion, and the non-elastic portion is connected to the bed. The non-elastic portion may have a hook-and-loop connecting structure that permits the non-elastic portion to connect to itself in a loop, and each of the tether straps is connected to the bed such that a connecting member on the bed is received in the loop.

According to another aspect, the method includes connecting a fastener to the bed, wherein the fastener includes an engagement member, and one of the tether straps is connected to the bed by engaging the one of the tether straps the engagement member of the fastener.

According to a further aspect, the method may utilize a sliding member formed of a low friction material and connected to the bottom surface of the sheet, with the sliding member having a fixed portion that is fixed to the bottom surface of the sheet and a free portion that is moveable over a range of movement with respect to the bottom surface of the sheet along a lateral direction extending between side edges of the sheet. When the sheet is moved toward the back wall of the wedge, at least a portion of the bottom surface of the sheet slides against the sliding member within the range of movement of the sliding member to reduce the friction of the sliding member.

According to yet another aspect, the first pair of tether straps are connected to opposed side edges of the sheet proximate the top edge, and the second pair of tether straps are connected to the opposed side edges of the sheet proximate the bottom edge. The first pair of tether straps may also be connected to the first and second sides of the bed proximate the head, and the second pair of tether straps are connected to the first and second sides the bed proximate the bottom edge.

Still further aspects of the invention relate to a method for use with a bed and a sheet as described above. The sheet is placed on the bed, and the sheet includes a sliding member formed of a low friction material connected to the bottom surface of the sheet. The sliding member has a fixed portion that is fixed to the bottom surface of the sheet and a free portion that is moveable over a range of movement with respect to the bottom surface of the sheet along a lateral direction extending between the side edges. The patient is positioned above the supporting surface of the bed, such that at least a portion of the patient rests above the sheet. The first side edge of the sheet is then moved toward the first side of the bed along the lateral direction, such that at least a portion of the bottom surface of the sheet slides against the sliding member within the range of movement of the sliding member when the sheet is moved toward the first side of the bed along the lateral direction.

According to one aspect, a support device is placed at least partially underneath the sheet, by inserting the support device underneath the first side edge of the sheet from the first side of the bed. Moving the first side edge of the sheet toward the first side of the bed along the lateral direction slides the patient and at least a portion of the sheet at least partially up on top of the support device, such that the support device at least partially supports one side of the patient to cause the patient to lie in an angled position. The sliding member includes a sheet of flexible material connected to the bottom surface of the sheet along a longitudinal direction extending between the top and bottom edges. The sheet of flexible sheet material may be formed in a tubular structure, where the tubular structure has a central passage aligned with the longitudinal direction. The sliding member may be connected to the bottom surface of the sheet along at least one connection line extending along the longitudinal direction.

According to another aspect, a plurality of tether straps connected to the sheet and extending from the sheet are also connected to the bed. The tether straps include at least first and second pairs of tether straps, where the first pair of tether straps are connected proximate the top edge and the second pair of tether straps are connected proximate the bottom edge.

According to another aspect, the sheet further includes a second sliding member similar to the first sliding member, which functions in a similar manner when the sheet is moved. Each sliding member may include a sheet of flexible material connected to the bottom surface of the sheet along a longitudinal direction extending between the top and bottom edges, such that the sliding members are substantially parallel to each other. The sliding members may each be formed in a tubular structure with a central passage aligned with the longitudinal direction, such that the central passages of the two sliding members are substantially parallel. Further, each sliding member may be connected to the bottom surface of the sheet along at least one connection line extending along the longitudinal direction, such that the connection lines of the two sliding members are substantially parallel.

Other features and advantages of the invention will be apparent from the following specification taken in conjunction with the following drawings.

BRIEF DESCRIPTION OF THE DRAWINGS

FIG. 3 is a bottom perspective view of the flexible sheet of FIG. 2, with hands illustrating gripping of the flexible sheet;

FIG. 4 is a top perspective view of a wedge of the system of FIG. 1;

FIG. 5 is a bottom perspective view of the wedge of the system of FIG. 1;

DETAILED DESCRIPTION

Figure 1:
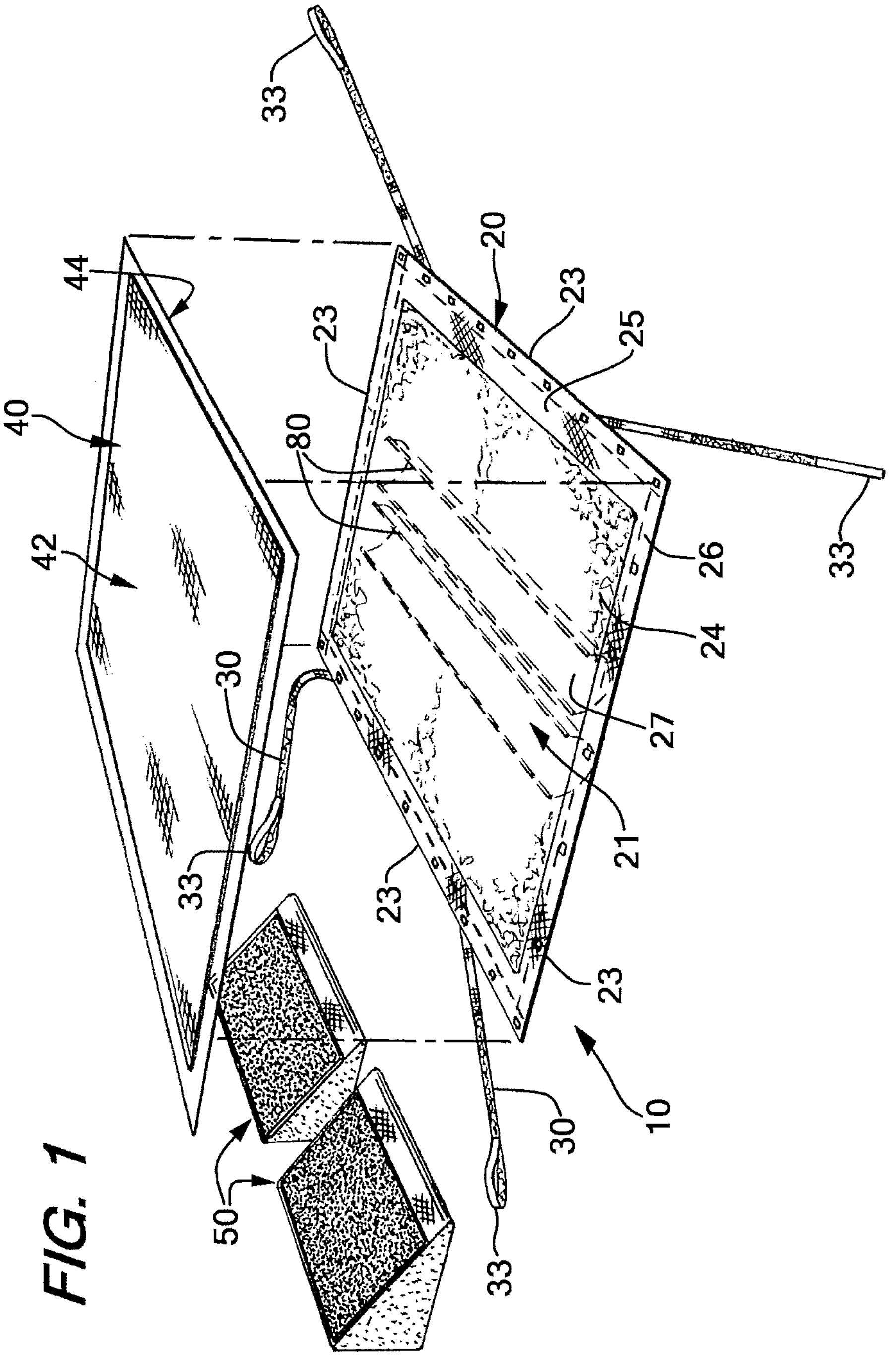
FIG. 1 is an exploded perspective view of one embodiment of a system for use in turning and positioning a patient, according to aspects of the invention.

While this invention is susceptible of embodiment in many different forms, there are shown in the drawings, and will herein be described in detail, preferred embodiments of the invention with the understanding that the present disclosure is to be considered as an exemplification of the principles of the invention and is not intended to limit the broad aspects of the invention to the embodiments illustrated and described.

In general, the invention relates to one or more apparatuses or devices, including a sheet having a high friction or gripping surface and a low friction or slipping surface, an absorbent body pad configured to be placed over the sheet, and one or more wedges configured to be placed underneath the sheet to support the patient in an angled position, as well as systems including one or more of such devices and methods utilizing one or more of such systems and/or devices. Various embodiments of the invention are described below.

Referring now to the figures, and initially to FIGS. 1-6, there is shown an exemplary embodiment of a system 10 for use in turning and positioning a person in a supine position, such as a patient lying on a hospital bed. As shown in FIG. 1, the system 10 includes a sheet 20, an absorbent body pad 40 configured to be placed over the sheet 20, and one or more wedges 50 configured to be placed under the sheet 20. The patient can be positioned on top of the body pad 40, with the body pad 40 lying on the sheet 20, and one or more wedges 50 optionally positioned underneath the sheet 20.

Figure 6:
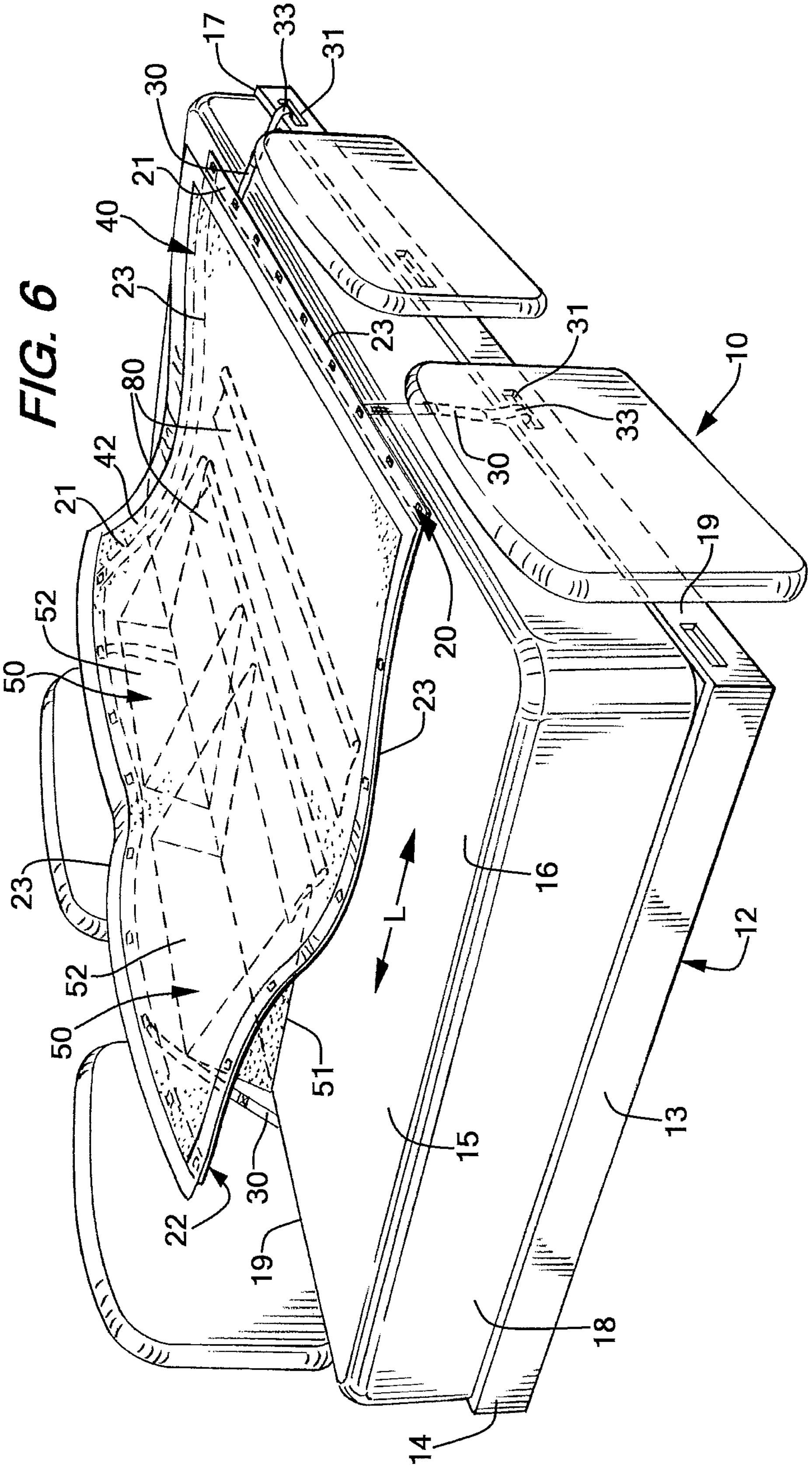
FIG. 6 is a perspective view of the system of FIG. 1 positioned on a bed.

As shown in FIG. 6, the system 10 is configured to be placed on a bed 12 or other support apparatus for supporting a person in a supine position. The bed 12 generally includes a frame 14 and a supporting surface 16 supported by the frame 14, as shown in FIG. 6, and has a head 13, a foot 17 opposite the head 13, and opposed sides or edges 19 extending between the head 13 and the foot 17. The supporting surface 16 can be provided by a mattress 18 or similar structure, and in various embodiments, the mattress 18 can incorporate air pressure support, alternating air pressure support and/or low-air-loss (LAL) technology. These technologies are known in the art, and utilize a pump motor or motors (not shown) to effectuate airflow into, over and/or through the mattress 18. The air aids in supporting the patient, and the top of the mattress 18 may be breathable so that the airflow can pull heat and moisture vapor away from the patient. The bed 12 may also include one or more bed sheets 15 (such as a fitted sheet or flat sheet), as shown in FIGS. 9*a-c* and 10*a-c*, as well as pillows, blankets, additional sheets, and other components known in the art. Further, the bed 12 may be an adjustable bed, such as a typical hospital-type bed, where the head 13 (or other parts) of the bed 12 can be raised and lowered, such as to incline the patient's upper body. It is understood that the system 10 and the components thereof can be used with other types of beds 12 as well.

Figure 2:
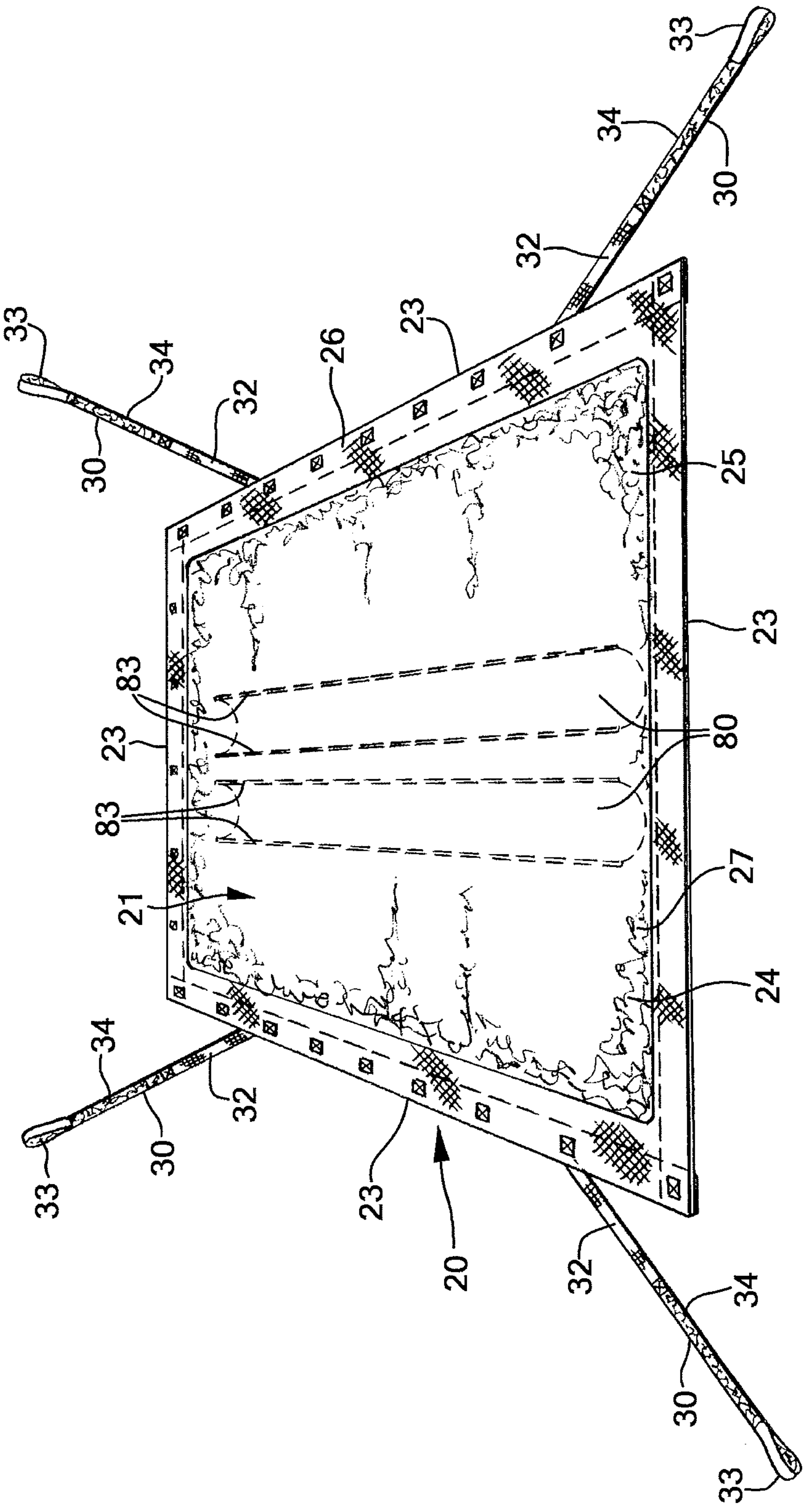
FIG. 2 is a top elevation view of a flexible sheet of the system of FIG. 1.

An example embodiment of the sheet 20 is shown in greater detail in FIGS. 2-3. In general, the sheet 20 is flexible and foldable, and has a top surface 21 and a bottom surface 22 defined by a plurality of peripheral edges 23. The sheet 20 is configured to be positioned on the bed 12 so that the bottom surface 22 is above the supporting surface 16 of the bed 12 and faces or confronts the supporting surface 16, and is supported by the supporting surface 16. As used herein, "above," "below," "over," and "under" do not imply direct contact or engagement. For example, the bottom surface 22 being above the supporting surface 16 means that that the bottom surface 22 may be in contact with the supporting surface 16, or may face or confront the supporting surface 16 and/or be supported by the supporting surface 16 with one or more structures located between the bottom surface 22 and the supporting surface 16, such as a bed sheet 15 as described above. Likewise, "facing" or "confronting" does not imply direct contact or engagement, and may include one or more structures located between the surface and the structure it is confronting or facing.

As seen in FIGS. 2-3, the sheet 20 in this embodiment is rectangular, having four peripheral edges 23, but could be a different shape in other embodiments. The top surface 21 has at least a portion formed of a high-friction or gripping material 24, and the bottom surface 22 has at least a portion formed of a low-friction or sliding material 25. In this embodiment, the sheet includes a first piece 26 of sheet material that is formed partially or entirely of the low-friction material 25, with a second piece 27 of sheet material that is formed partially or entirely of the high-friction material 24, with the second piece 27 connected to the first piece 26 in a surface-to-surface, confronting relation to form a layered structure. As illustrated in FIGS. 2-3, the first piece 26 is larger than the second piece 27, so that the first piece 26 forms the entire bottom surface 22 of the sheet 20, and the second piece 27 forms at least a majority portion of the top surface 21, with the edges of the second piece 27 being recessed from the edges 23 of the sheet 20. In other words, in this embodiment, the sheet 20 is primarily formed by the first piece 26, with the second piece 27 connected to the first piece 26 to form at least a part of the top surface 21. In another embodiment, the first piece 26 forms at least a majority portion of the bottom surface 22, and the second piece 27 forms at least a majority portion of the top surface 21. The pieces 26, 27 are connected by stitching in one embodiment, but may have additional or alternate connections in other embodiments, including adhesives, sonic welding, heat welding and other techniques, including techniques familiar to those skilled in the art. Additionally, the low-friction material 25 and/or the high-friction material 24 may be formed by multiple pieces in other embodiments. For example, the first piece 26 made of the low-friction material 25 may have a plurality of strips or patches of the high-friction material 24 connected on the top surface 21 in one embodiment. In a further embodiment, the high friction material 24 may be or include a coating applied to the low friction piece 26, such as a spray coating. In yet another embodiment, the high-friction material 24 may be formed of a directional glide material that permits gliding freely in one direction, such as toward the head 13 of the bed 12, and resists gliding in the opposite direction, such as toward the foot 17 of the bed 12. For example, a directional glide material may be formed by a stitched material with a directional stitching pattern or a material having a directionally oriented texture, such as by having a ridged or other textured structure. It is understood that a confronting surface (e.g., the underside of the pad 40) may have a complementary material that works with the directional glide material to limit sliding in one direction. As described in greater detail below, the low-friction material 25 permits sliding of the sheet 20 in contact with the supporting surface 16 of the bed 12, which may include a fitted bed sheet 15 or other sheet, and the high-friction material 24 provides increased resistance to slipping or sliding of the patient and/or the body pad 40 on which the patient may be lying, in contact with the sheet 20.

As shown in the embodiment in FIGS. 1-6, the first piece 26 is made substantially entirely of the low-friction material 25. In one embodiment, the low-friction material 25 is at least partially made from polyester and/or nylon (polyamide), although other materials can be used in addition to or instead of these materials. In one embodiment, the high friction material 24 is a warp knit tricot material that may be brushed, napped, and/or sanded to raise its pile, which can enhance comfort, and may be made of polyester and/or another suitable material. The material 24 can then be treated with a high friction substance, such as a hot melt adhesive or appropriate plastic, which can be applied as a discontinuous coating to promote breathability. The material 24 can also be treated with a water repellant, such as PTFE. In other embodiments, the high-friction material 24 may include any combination of these components, and may contain other components in addition to or instead of these components. Additionally, both the first and second pieces 26, 27 may be breathable in one embodiment, to allow passage of air, heat, and moisture vapor away from the patient.

Generally, the high friction material 24 has a coefficient of friction that is higher than the coefficient of friction of the low friction material 25. In one embodiment, the coefficient of friction for the high friction material 24 is about 8-10 times higher than the coefficient of friction of the low friction material 25. In another embodiment, the coefficient of friction for the high friction material 24 is between 5 and 10 times higher, or at least 5 times higher, than the coefficient of friction of the low friction material 25. The coefficient of friction, as defined herein, can be measured as a direct proportion to the pull force necessary to move either of the materials 24, 25 in surface-to-surface contact with the same third material, with the same normal force loading. Thus, in the embodiments above, if the pull force for the high friction material 24 is about 8-10 times greater than the pull force for the low friction material 25, with the same contact material and normal loading, the coefficients of friction will also be 8-10 times different. It is understood that the coefficient of friction may vary by the direction of the pull force, and that the coefficient of friction measured may be measured in a single direction. For example, in one embodiment, the above differentials in the coefficients of friction of the high friction material 24 and the low friction material 25 may be measured as the coefficient of friction of the low friction material 25 based on a pull force normal to the side edges 23 (i.e. proximate the handles 28) and the coefficient of friction of the high friction material 24 based on a pull force normal to the top and bottom edges 23 (i.e. parallel to the side edges 23).

Additionally, the coefficient of friction of the interface between the high-friction material 24 and the pad 40 is greater than the coefficient of friction of the interface between the low friction material 25 and the bed sheet 15 or supporting surface 16. It is understood that the coefficients of friction for the interfaces may also be measured in a directional orientation, as described above. In one embodiment, the coefficient of friction for the interface of the high friction material 24 is about 8-10 times higher than the coefficient of friction of the interface of the low friction material 25. In another embodiment, the coefficient of friction for the interface of the high friction material 24 is between 5 and 10 times higher, or at least 5 times higher, than the coefficient of friction of the interface of the low friction material 25. It is understood that the coefficient of friction for the interface could be modified to at least some degree by modifying factors other than the sheet 20. For example, a high-friction substance or surface treatment may be applied to the bottom surface 44 of the pad 40, to increase the coefficient of friction of the interface. An example of a calculation of the coefficients of friction for these interfaces is described below, including a rip-stop nylon material as the low friction material 25 and a warp knit tricot material that was brushed, napped, and/or sanded and treated with a hot melt adhesive as the high friction material 24.

EXAMPLE

A 20"×20" section of bed linen (60% cotton, 40% polyester, 200 threads/inch) was taped without slack to a table top. A 10"×10" section of blue ripstop nylon was placed on top of the section of bed linen, then a 5 lb., 8" diameter weight was centered on top of the ripstop nylon. A force gauge (Extech 475044, 44 lb.max, digital) was attached to the ripstop nylon and was used to pull/slide the weighted ripstop nylon across the surface of the bed linen. The peak force to slide was recorded. Similarly, a 20"×20" section of tricot (warp knit tricot material that was brushed, napped, and/or sanded and treated with a hot melt adhesive) was taped without slack to a table top. A 10"×10" section of an absorbent body pad was placed on top of the section of the tricot material (patient side facing up), then the 5 lb., 8" diameter weight was centered on top of the body pad. The force gauge was attached to the body pad and was used to pull/slide the weighted body pad across the surface of the tricot material. The peak force to slide was recorded. The table below illustrates the results.

| | Pull Force (lb) to Induce Sliding (Material A/Material B) | |
|---|---|---|
| Data Point | Ripstop Nylon/ Bed Linen | Body Pad/ Tricot Material |
| 1 | 1.68 | 13.74 |
| 2 | 1.56 | 13.85 |
| 3 | 1.50 | 12.91 |
| 4 | 1.43 | 12.86 |
| 5 | 1.55 | 13.14 |
| 6 | 1.67 | 12.63 |
| Ave | 1.57 | 13.19 |
| SD | 0.10 | 0.50 |

As illustrated by the above data, the average pulling force required was approximately 8.4 times greater for the underpad-tricot interface than for the ripstop nylon-bed linen interface. Dividing the average required pull force by the 5 lb normal force gives a coefficient of friction for the interface of ripstop nylon-bed linen of 0.314 and a coefficient of friction for the interface of underpad-tricot of 2.638, which is approximately 8.4 times higher than the coefficient of friction for the ripstop nylon-bed linen interface.

In the embodiment of FIGS. 1-6, the sheet 20 also includes one or more sliding members 80 connected to the bottom surface 22 of the sheet 20, which is/are configured to assist with lateral sliding of the sheet 20 across the supporting surface 16 of the bed 12. The sliding member(s) 80 of the embodiment of FIGS. 1-6 and their functioning are shown in closer detail in FIGS. 10*a-c*. In one embodiment, the sliding member has a fixed portion 81 that is fixed to the bottom surface 22 of the sheet 20 at one or more connection points 83 and a free portion 82 that is moveable over a range of movement with respect to the bottom surface 22 of the sheet 20 along a lateral direction L extending between the side edges 23 of the sheet 20 and/or between the sides 19 of the bed 12. The lateral direction of movement L as shown in FIGS. 2 and 10*a-c* is parallel to the top edge 23 and perpendicular to the side edges 23 of the sheet 20. At least a portion of the bottom surface 22 of the sheet 20 is configured to slide against the sliding member 80 within the range of movement of the sliding member when the sheet 20 is moved along the lateral direction L, as described in greater detail below.

The sliding member 80 may be at least partially formed of a low-friction material that has a lower coefficient of friction than the high friction material 24, in order to facilitate sliding of the sliding member 80, and in one embodiment, the sliding member 80 may be made of the same low friction material 25 used for the sheet 20. In this configuration, the bottom surface 22 of the sheet 20 slides more easily against the sliding member 80 than against the confronting surface of the bed 12, which reduces the force necessary to slide the sheet 20 in the lateral direction L, at least within the range of movement of the sliding member 80. This reduced coefficient of friction may be particularly useful for assisting in overcoming inertial and/or static friction resistance to initial movement of the sheet 20. The low friction material of the sliding member 80 may also have a lower coefficient of friction than the confronting surface of the bed 12, such as the bed sheet 15, in one embodiment. In another embodiment, the sliding member 80 may have a lower coefficient of friction on at least one surface as compared to at least one other surface thereof. For example, in a tubular sliding member 80 as shown in FIGS. 1-6 and 10*a-c*, the inner surfaces of the sliding member may have a lower coefficient of friction than the outer surfaces (i.e., the surfaces that contact the confronting surface of the bed 12. This configuration further aids sliding of the bottom surface 22 of the sheet 20 against the inner surfaces of the sliding member 80. The outer surfaces of the sliding member 80 may have a higher coefficient of friction than the inner surfaces, and may have a coefficient of friction that is higher than that of the confronting surface of the bed 12 in one embodiment. In this configuration, lateral sliding of the bottom surface 22 of the sheet 20 against the low-friction inner surfaces of the sliding member 80 is facilitated, while the higher-friction outer surfaces resist sliding of the sheet 20 in the longitudinal direction. Such differences in frictional properties between the opposing surfaces may be accomplished by the use of laminate construction, coatings, different stitching patterns, surface treatments and textures, and other techniques. The sliding members 80 are positioned proximate the area where the center of mass of the patient would be, in order to provide friction resistance in one of the highest friction areas of the system 10. Further, in one embodiment, the sliding member 80 is configured such that the range of movement of the sliding member 80 in the longitudinal direction (i.e. between the top and bottom edges 23 and/or between the head 17 and foot 19 of the bed 12 when positioned as shown in FIG. 6) is significantly smaller than the range of movement in the lateral direction L, and in some configurations, the range of movement in the longitudinal direction may be minimal. Accordingly, the sliding member 80 provides little or no assistance in moving the sheet 20 in the longitudinal direction, and does not encourage the sheet 20 to slide toward the foot 19 of the bed 12 when placed under a patient in an inclined position. Further, as described above, the sliding member 80 may have a higher-friction outer surface that resists sliding in the longitudinal direction.

Figures 10A, 10B, 10C:
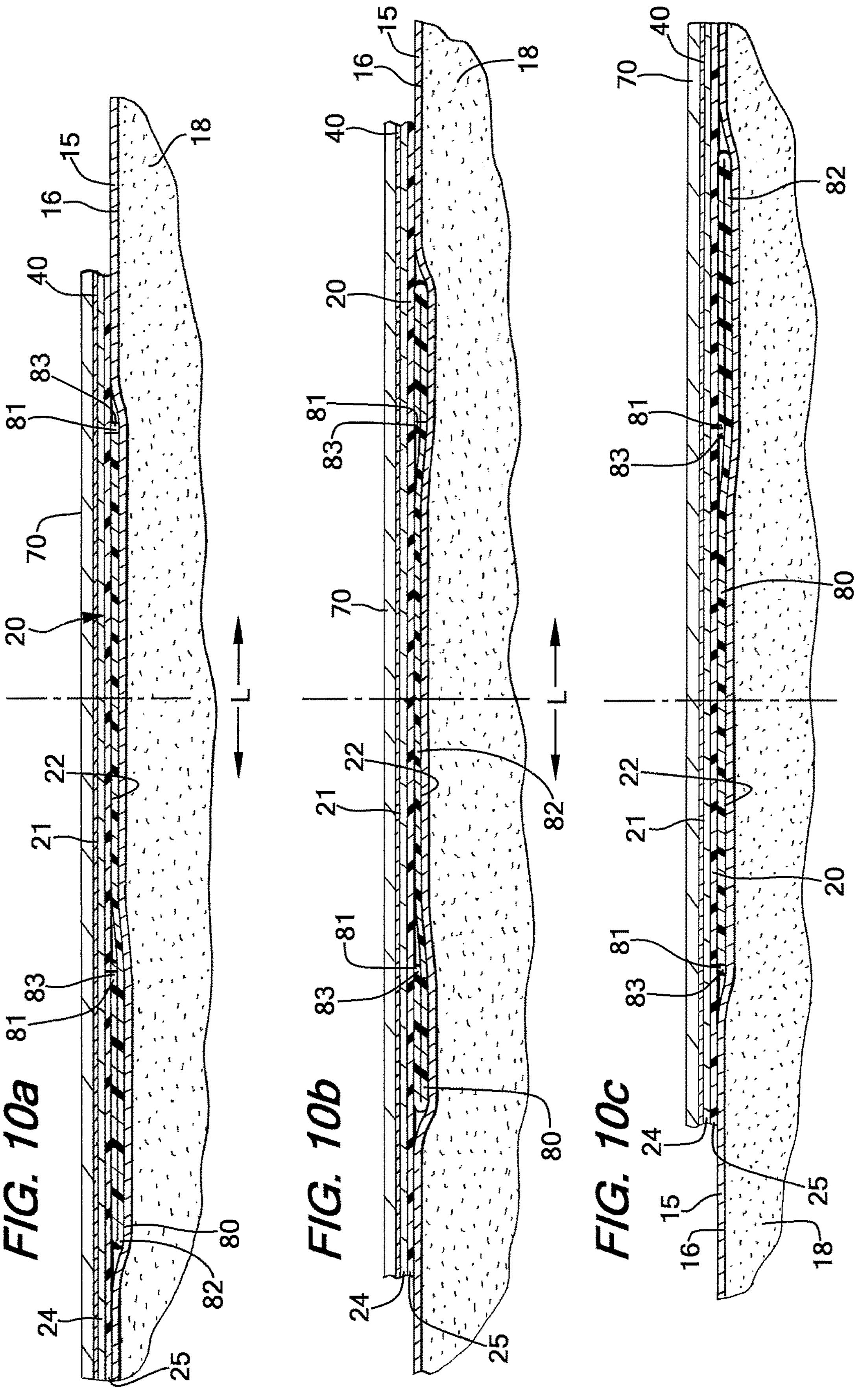
FIGS. 10*a-c* are a sequential series of views illustrating a cross-section of a portion of the system of FIG. 6 during lateral movement on the bed.

In the embodiment of FIGS. 1-6 and 10*a-c*, the sheet 20 includes two sliding members 80 that are positioned in substantially parallel and spaced relation on the bottom surface 22 of the sheet 20. Each of the sliding members 80 is a piece of flexible sheet material or other flexible material connected to the bottom surface 22 of the sheet at one or more connection points 83. As described above, the flexible material may also be a low friction material. In the embodiment of FIGS. 1-6 and 10*a-c*, each of the sliding members 80 is an 8-inch wide piece of sheet material connected to the sheet 20 at two linear connection points 83 that are 4 inches apart, and each of the connection points 83 is a line extending longitudinally (i.e., in a direction between the top and bottom edges 23), formed by stitching. The sliding member 80 may be connected to the sheet 20 by additional or alternate methods in other embodiments, including by use of bonding materials, various types of welding, fasteners, and other connection techniques. The linear connection points 83 for the individual sliding member 80 are parallel to each other and also parallel to the linear connection points 83 of the other sliding member 80, in this embodiment. It is noted that the ends of the sheet material of the sliding member 80 are connected at the connection points 83 in this embodiment, however in other configurations, the connection points 83 may be connected inward from the ends, and may leave loose ends that may or may not also be connected to the sheet 20. Additionally, in the embodiment of FIGS. 1-6 and 10*a-c*, each sliding member 80 is formed as a loop or tube of material that has two fixed portions 81 connected at the two connection points/lines 83. The central passage 85 of each tube-shaped sliding member 80 is aligned with the longitudinal direction, and the passages 85 of the two sliding members 80 are substantially parallel to each other. In this configuration, when force is applied to move the sheet 20 along the lateral direction L, the portions of the bottom surface 22 of the sheet 20 located around the sliding member 80 slide against the loop sliding member 80, reducing the friction during movement, as shown in FIGS. 10*a-c* and described in greater detail below. It is understood that when the sliding member 80 is a loop of material, portions of the inner surface of the sliding member 80 may also slide against itself. In another embodiment (not shown), the sliding member may instead be configured as a loose flap of material having a fixed portion connected at a connection point (which may be linear and longitudinal) and a free portion extending from the connection point. In other embodiments, the sheet 20 may include a greater or smaller number of sliding members 80, and may include sliding members 80 that are differently configured and/or positioned. For example, in one embodiment, the sheet 20 may include one or more sliding members 80 configured to assist movement in the longitudinal direction or in one or more other directions. It is understood that a sliding member 80 configured for assisting movement in another direction may be oriented substantially perpendicular to such direction. For example, for assisting movement in the longitudinal direction, the sliding member 80 may be rotated 90° from the orientation depicted in FIGS. 1-6, so that the sliding member 80 extends in the lateral direction L, rather than the longitudinal direction.

The sliding member 80 has a range of movement in the lateral direction L with respect to the bottom surface 22 of the sheet 20 that is dependent upon the lateral width of the sliding member 80. The range of movement may alternately be expressed as the maximum distance that a point on the sheet 20 can move without any sliding occurring between the sliding member 80 and the confronting surface of the bed 12, or in other words, the maximum distance that the sheet 20 and the sliding member 80 can slide against each other. FIGS. 10*a-c* illustrate the range of movement of the sliding member 80 of the embodiment in FIGS. 1-6. FIG. 10*a* illustrates the maximum leftward position of the sheet 20 with respect to the sliding member 80, and any further leftward movement will result in sliding of the sliding member 80 against the bed sheet 15. FIG. 10*c* likewise represents the maximum rightward position of the sheet 20 with respect to the sliding member 80, and any further rightward movement will result in sliding of the sliding member 80 against the bed sheet 15. In the embodiment of FIGS. 1-6 and 10*a-c*, both sliding members 80 have similar or identical ranges of movement, and in another embodiment, two or more sliding members 80 may have different ranges of movement. The range of movement of the sliding member 80 is the distance that the sheet 20 moves between the position in FIG. 10*a* and the position in FIG. 10*c*. FIG. 10*b* illustrates a midpoint between the two extremes of FIGS. 10*a* and 10*c*. The range of movement R of the sliding member 80 in the embodiment of FIGS. 1-6 and 10*a-c* (a loop connected to the bottom surface of the sheet 20 at two connection points 83) may be defined or estimated using the following equation:

$$R=W-D$$

where W represents the total lateral width of material between the two connection points 83 (which is the total width of the material if connected at the ends), and where D represents the distance between the two connection points 83. In the embodiment of FIGS. 1-6 and 10*a-c*, where the lateral width W of the material of the sliding member 80 is 8 inches and the spacing D between the connection points 83 is 4 inches, the total range of motion R is 4 inches. It is noted that a loop of material connected along a single stitching line would be considered to be connected at two points separated by D=0. In another embodiment, where the sliding member 80 is a flap connected at a single connection point, the range of movement R is equal to twice the lateral width W of the flap.

Additionally, each sliding member 80 provides an area of contact between the low friction material 25 of the sheet 20 and the low friction material of the sliding member 80 (and contact of the low friction material of the sliding member 80 upon itself) that has a lateral width A corresponding to the equation A=(W+D)/2. For example, in the embodiment of FIGS. 1-6 and 10*a-c*, where the lateral width W of the material of the sliding member 80 is 8 inches and the spacing D between the connection points 83 is 4 inches, the total width A of the area of contact is 6 inches. The total area of contact would equal the width multiplied by the longitudinal length of the sliding member 80 in this embodiment. Increased area of contact between the low friction materials may further reduce the force necessary for initial movement.

In the embodiment of FIGS. 1-6, the sheet 20 also includes a plurality of elongated tether straps 30 connected to the sheet 20 and extending from the sheet 20 to connect to the bed 10 to secure the sheet 20 in place. As shown in FIG. 6, the tether straps 30 are connected to the side edges 23 of the sheet 20 and extend to connect the strap 30 to the bed 12, such as by connection to a connection member 31 on the bed 12. The connection member 31 may be an existing structure on the bed 12, such as brackets/slots for fastening of restraints or strapping down the mattress 18, as illustrated in FIG. 6, or may alternately be a separate fastener 36 connected to the bed 12 to create a connection member for one or more straps 30, as described below. The straps 30 are configured for being releasably connected to the bed 12, and may include a releasable connecting structure 33, such as a hook-and-loop connecting structure as shown in FIGS. 1-3 and 6, as well as other types of releasable or non-releasable connections, e.g., clips, hooks, clasps, buckles, ties, etc. Additionally, the hook and loop connecting structure 33 allows for adjustability in the tightness of the connection of the strap 30 to the bed 12. In another embodiment, the straps 30 may include a different type of adjustable connecting structure 33, such as an adjustable buckle. In a further embodiment, two or more straps 30 may connect to each other, such as by clips, hooks, buckles, clasps, ties, etc., to connect the straps 30 to the bed 12.

The sheet 20 in the embodiment of FIGS. 1-6 includes four tether straps 30. A first pair of straps 30 extends from the left and right sides 23 of the sheet 20 proximate the top edge 23 of the sheet 20, which are configured for connection to the sides 19 of the bed 12 proximate the head 13. A second pair of straps 30 extends from the left and right sides 23 of the sheet 20 proximate the bottom edge 23 of the sheet 20, which are configured for connection to the sides 19 of the bed 12 proximate the foot 17. The straps 30 shown in FIG. 6 may alternately connect to a different area on the bed 12, such as the head 13 and/or the foot 17. In other embodiments, the sheet 20 may contain a different number of straps 30 and/or may contain straps in additional or different locations from the locations shown in FIGS. 1 and 6. For example, the straps 30 illustrated in FIGS. 1-6 are located near, but not at, the corners of the sheet 20, and in another embodiment, at least some of the straps 30 may be located at the corners, or on the top and/or bottom edges 23 of the sheet 20 near the corners. As another example, the sheet 30 may include a single tether strap, and/or the one or more tether straps 30 may have elastic and non-elastic portions that are releasably connected to each other (e.g., via hook-and-loop structure), as shown and described in parent U.S. patent application Ser. No. 13/014,497 and U.S. patent application Ser. No. 13/014,500.

In the configuration shown in FIGS. 1-3 and 6, the straps 30 proximate the head 13 of the bed 12 assist in resisting slipping of the sheet 20 toward the foot 17 of the bed 12, which tends to occur particularly when the head 13 of the bed 12 is inclined. It is understood that some degree of downward slippage may occur, and caregivers may "boost" the sheet 20 toward the head 13 of the bed 12 to counteract past slippage. The straps 30 proximate the foot 17 of the bed 12 assist in preventing "over-boosting" and in keeping the sheet 20 in the proper position on the bed 12. Over-boosting can create additional and unnecessary shear forces on the patient and/or can make the patient more likely to slip downward on the bed 12. In further embodiments, the sheet 20 may not include the straps 30 at the bottom of the sheet 20, or the sheet 20 may not include the straps 30 near the top of the sheet 20.

Each strap 30 may be made from a single piece or multiple pieces. In the embodiment of FIGS. 1-6, each strap 30 includes an elastic portion 32 that is flexible and stretchable and a non-elastic portion 34 that has little to no stretchability. The elastic portion 32 may be made from an elastic material that allows a stretch ratio of about 2-3 times its initial length in one embodiment, or may be made from other elastic materials in another embodiment. The elastic and non-elastic portions 32, 34 each form a portion of the length of the strap 30, as shown in FIGS. 1-3 and 6, and are connected at proximate ends. As shown in FIGS. 1-3 and 6, the elastic portion 32 is stitched to the sheet 20, and the non-elastic portion 34 is stitched to the free end of the elastic portion 32 and is connected to the connecting structure 33 for connection to the bed 12. In one embodiment, the non-elastic portion 34 may include a hook-and-loop connecting structure 33, which includes a patch of hook material and a patch of loop material. In another embodiment, the non-elastic portion 34 may include only a patch of hook material and may be formed of a material that is able to constitute a loop structure to form a hook-and-loop connection for the connecting structure 33. As shown in FIG. 6, the non-elastic portion 34 can be looped through the connection member 31 on the bed 12, and then attached to itself using the hook-and-loop connecting structure 33, such that the connection member 31 on the bed 12 is received in the loop to connect the tether strap 30 to the bed 12. Once connected to the bed 12, the straps 30 resist or the sheet 20 from sliding downward or otherwise out of position, particularly when the head 13 of the bed 12 is inclined. The elastic portion 32 provides for slight freedom of movement in this situation. In one embodiment, the straps 30 near the top edge 23 of the sheet 20 may have a longer elastic portion 32 as compared to the straps 30 near the bottom edge 23 of the sheet 20, which gives the top straps 30 a slightly larger degree of stretching and movement. Further, the releasable connecting structure 33 on each strap 30 permits easier disconnection of the tether straps 30 for circumstances in which it is necessary to disconnect the straps 30 to move or reposition the patient, as the connection member(s) 31 on the bed 12 may not be able to be repositioned. In one embodiment, where the head 13 of the bed 12 can be raised and lowered, any straps 30 near the head 13 may be connected to connection members 31 that raise and lower with the head 13, so the straps 30 do not need to be disconnected in order to raise the head 13. In alternate embodiments, the straps 30 may each be made entirely of an elastic material or a non-elastic material, may have additional portions made of additional materials, or may have multiple portions made of an elastic material, non-elastic material, and/or other material.

Figure 9A:
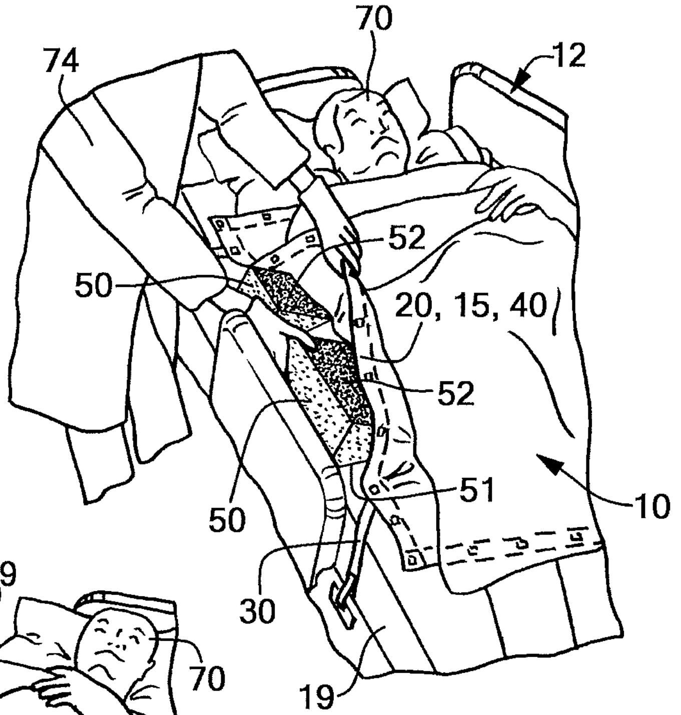
FIGS. 9*a-c* are a sequential series of views illustrating a method of turning a patient to an angled resting position utilizing the system of FIG. 1, according to aspects of the invention.
Figure 9B:
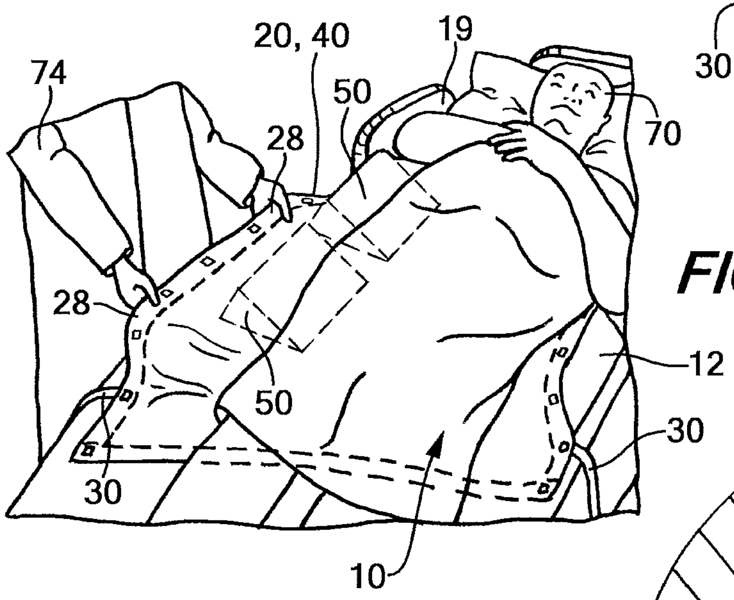
Figure 9C:
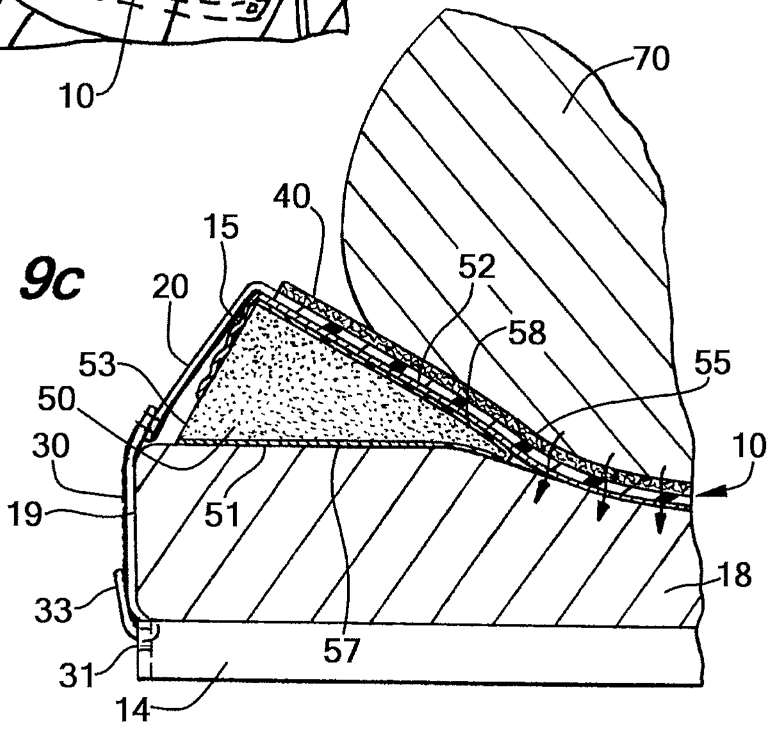
Figure 11A:
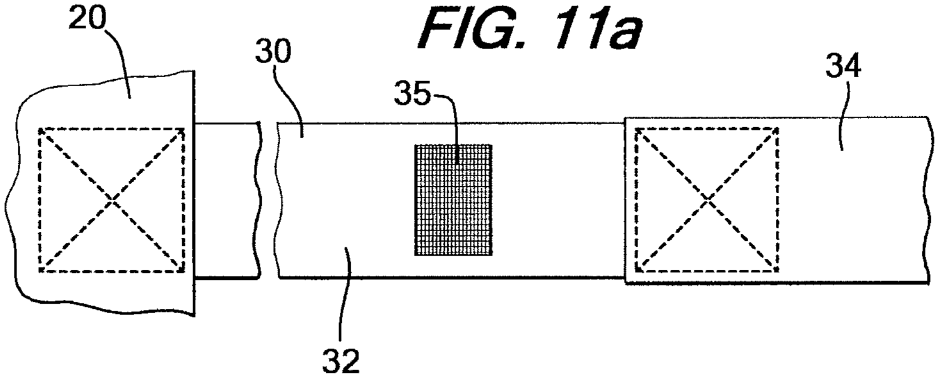
FIGS. 11*a-c* are a sequential series of views illustrating stretching of a tether strap of the system of FIG. 1.
Figure 11B:
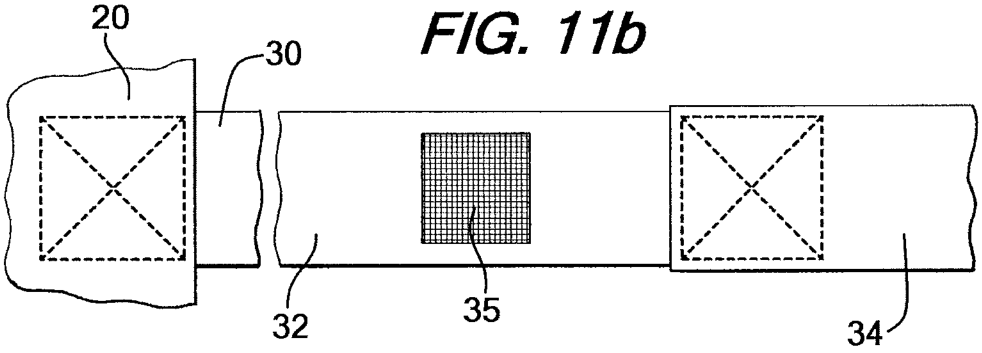
Figure 11C:
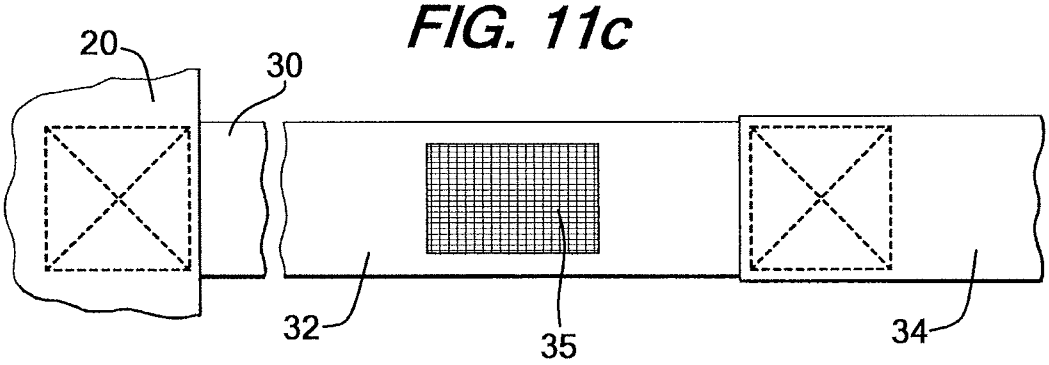

The elastic portions 32 of the straps 30 as shown in FIGS. 1-3 and 6 permit the straps to be fastened tightly to the bed 12, while still maintaining some elasticity to permit some degree of movement of the sheet 20. Fastening the straps 30 too tightly may reduce this freedom of movement, and fastening the straps 30 too loosely may leave too much freedom of movement. It is understood that some freedom of movement may be necessary in order to insert a wedge 50 underneath the sheet 20, as shown in FIGS. 9*a-c* and described below. In one embodiment, the elastic portion 32 of each tether strap 30 may have an indicator 35 that indicates the appropriate amount of stretching of the elastic portion 32 during fastening to reach the desired tautness or tightness of the strap 30, as illustrated in FIGS. 11*a-c*. The indicator 35 in this embodiment is formed by a marking (e.g., paint, dye, ink, etc.) on the elastic portion 32 in the shape of a rectangle that expands in width as the elastic portion 32 is stretched. FIG. 11*a* illustrates the appearance of the indicator 35 when the strap 30 is not stretched, giving the indicator 35 a rectangular appearance with a small width. FIG. 11*b* illustrates the appearance of the indicator 35 when the elastic portion 32 is stretched to an appropriate amount, giving the indicator 35 a square shape to indicate the correct tightness. FIG. 11*c* illustrates the appearance of the indicator 35 when the elastic portion 32 is stretched too far, giving the indicator 35 a rectangular appearance with a large width. In other embodiments, the strap 30 may use a different type of indicator 35. The elastic portions 32 of the straps 30 also provide some freedom of movement for caregivers to lift the side edges 23 of the sheet 20, e.g., for lifting and/or moving the patient, for inserting wedges 50 or other support devices beneath the sheet 20, etc. Ensuring that the straps 20 have the appropriate tautness ensures that this freedom of movement is sufficiently provided.

The sheet 20 may also include one or more handles 28 to facilitate pulling, lifting, and moving the sheet 20. As shown in FIGS. 2-3, the sheet 20 has handles 28 formed by strips 29 of a strong material that are stitched in periodic fashion to the bottom surface 22 at or around opposite edges 23 of the sheet 20. The non-stitched portions can be separated slightly from the sheet 20 to allow a user's hands 76 to slip underneath, and thereby form the handles 28, as shown in FIG. 3. Other types of handles may be utilized in other embodiments.

In further embodiments, the sheet 20 and the components thereof may have different configurations, such as being made of different materials or having different shapes and relative sizes. For example, in one embodiment, the low-friction material 25 and the high-friction material 24 may be made out of pieces of the same size. In another embodiment, the low-friction material 25 and the high-friction material 24 may be part of a single piece that has a portion that is processed or treated to create a surface with a different coefficient of friction. As an example, a single sheet of material could be treated with a non-stick coating or other low-friction coating or surface treatment on one side, and/or an adhesive or other high-friction coating or surface treatment on the other side. Still other embodiments are contemplated within the scope of the invention.

In an alternate embodiment, the sheet 20 may not utilize a high friction surface, and instead may utilize a releasable connection to secure the pad 40 in place with respect to the sheet 20. For example, the sheet 20 and pad 40 may include complementary connections, such as hook-and-loop connectors, buttons, snaps, or other connectors. In another alternate embodiment, the sheet 20 may not utilize a strap 30, and may resist sliding in another way. In a further embodiment, the sheet 20 may be used without a pad 40, with the patient directly in contact with the top surface 21 of the sheet, and the high-friction material 24 can still resist sliding of the patient on the sheet 20.

The sheet 20 may further include a positioning marker 84 to assist in properly positioning the sheet 20 beneath the patient. In the embodiment illustrated in FIG. 3, the positioning marker 84 is located along the top edge 23 of the sheet 20, on the bottom surface 22 of the sheet 20. This positioning marker 84 may be brightly colored in one embodiment. A positioning marker 84 in this position assists with positioning the sheet 20 beneath the patient when the sheet 20 is rolled or folded up, such as in FIG. 7*a*, where the bottom surface 22 of the sheet 20 will be visible. The positioning marker 84 indicates which edge 23 of the sheet is the top, to avoid the sheet 20 being placed on the bed 12 upside down or sideways. Additionally, the positioning marker 84 is in position to be aligned with the shoulders of the patient to assist in proper positioning. Other types of positioning markers may be used in other embodiments, including additional markers or other markers that take the place of the positioning marker 84 shown in FIG. 3.

Figure 12:
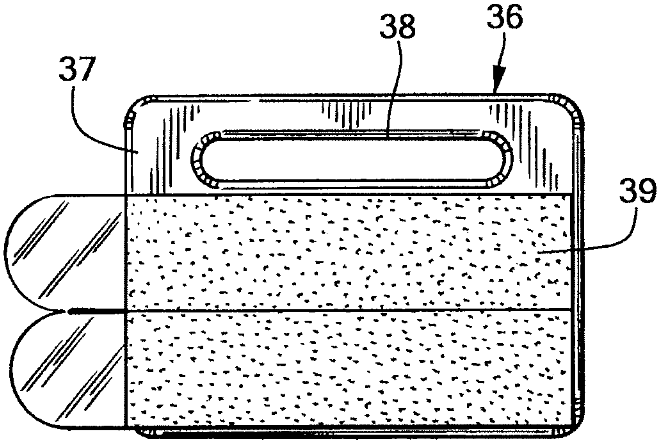
FIG. 12 is a front view of a fastener that is usable with the tether straps of the system of FIG. 1.
Figure 13:
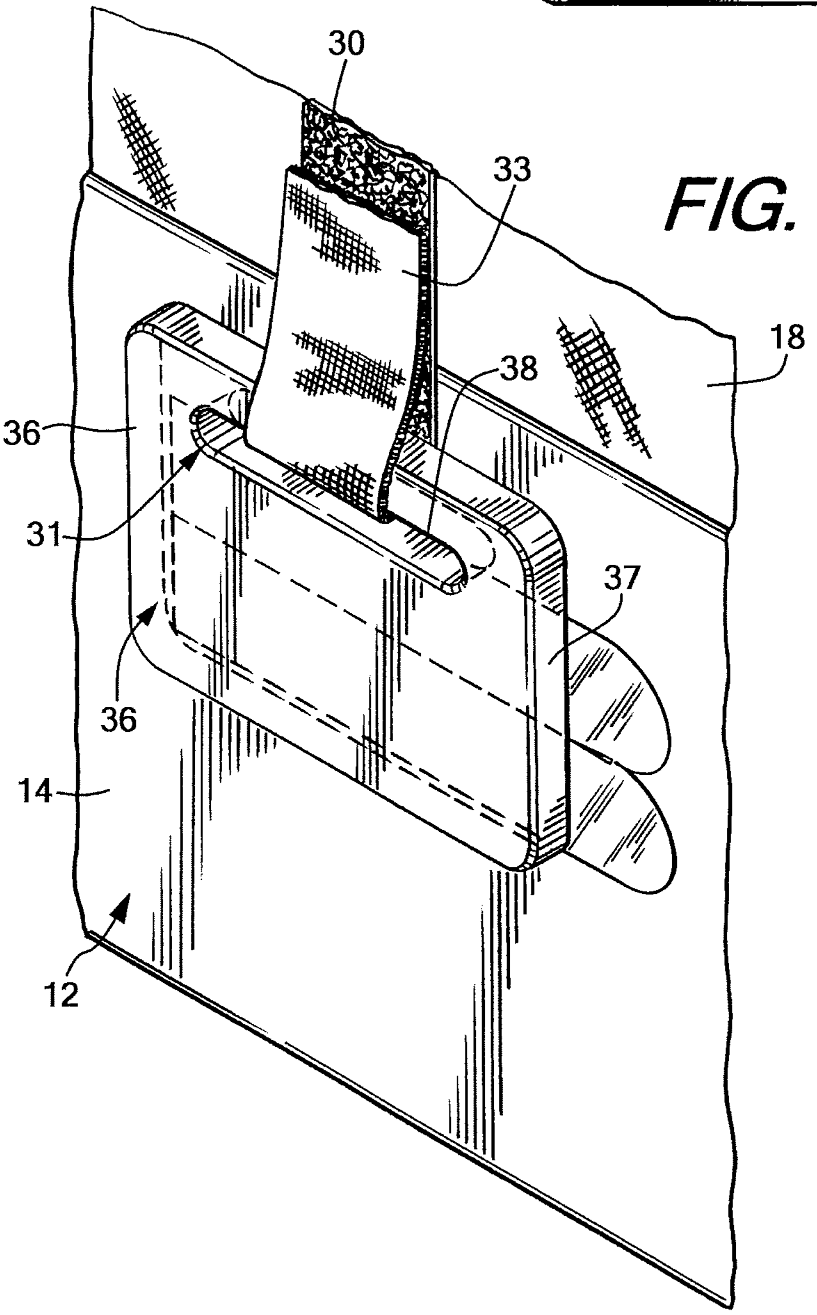
FIG. 13 is a perspective view of the fastener of FIG. 12 used to connect a tether strap of the system of FIG. 1 to the bed.

The system 10 can also include a fastener 36 that is connectable to the bed 12, to provide a connection member 31 for connecting one or more tether straps 30 to the bed 12. One embodiment of such a fastener 36 is illustrated in FIGS. 12-13. The fastener 36 may be connected to the bed frame 14, such as by adhesive or similar technique as shown in FIG. 13, or to another part of the bed 12, such as to the mattress 18. Additionally, the fastener 36 may be connectable to the strap 30 by a releasable connecting structure. In the embodiment of FIGS. 12-13, the fastener 36 may include a fastener body 37 having an engagement member 38 configured to be engaged by the strap 30 and an adhesive portion 39 configured for connecting the fastener body 37 to the bed 12. The engagement member 38 in the embodiment of FIGS. 12-13 is a hole that passes through the fastener body 37. It is understood that the adhesive portion 39 may have removable protective backing. A strap 30 of the embodiment of FIGS. 1-6 can be releasably connected to the fastener 36 by placing the end of the strap 30 through the hole 38 and then fastening the hook-and-loop connecting structure 33 as shown in FIG. 13. In another embodiment, other types of fasteners may be mounted to the bed 12 for connection of the straps 30, such as ties, snaps, buckles, adhesives, or other releasable or non-releasable fastener configurations.

The body pad 40 is typically made from a different material than the sheet 20 and contains an absorbent material, along with possibly other materials as well. The pad 40 provides a resting surface for the patient, and can absorb fluids that may be generated by the patient. The pad 40 may also be a low-lint pad, for less risk of wound contamination, and is typically disposable and replaceable, such as when soiled. The top and bottom surfaces 42, 44 may have the same or different coefficients of friction. Additionally, the pad 40 illustrated in the embodiments of FIGS. 1 and 6 is approximately the same size as the sheet 20, and both the sheet 20 and the pad 40 are approximately the same width as the bed 12 so that the edges 23 of the sheet 20 and the edges of the pad 40 are proximate the side edges of the bed 12, but may be a different size in other embodiments.

In one embodiment, the pad 40 may form an effective barrier to fluid passage on one side, in order to prevent the sheet 20 from being soiled, and may also be breathable, in order to permit flow of air, heat, and moisture vapor away from the patient and lessen the risk of pressure ulcers (bed sores). The sheet 20 may also be breathable to perform the same function, as described above. A breathable sheet 20 used in conjunction with a breathable pad 40 can also benefit from use with a LAL bed 12, to allow air, heat, and moisture vapor to flow away from the patient more effectively, and to enable creation of an optimal microclimate around the patient. FIG. 9*c* illustrates the breathability of the sheet 20 and the pad 40. The pad 40 may have differently configured top and bottom surfaces 42, 44, with the top surface 42 being configured for contact with the patient and the bottom surface 44 being configured for contact with the sheet 20.

The system 10 may include one or more wedges 50 that can be positioned under the sheet 20 to provide a ramp and support to slide and position the patient slightly on his/her side, as described below. FIGS. 4-5 illustrate an example embodiment of a wedge 50 that can be used in conjunction with the system 10. The wedge 50 has a body 56 that can be triangular in shape, having a base wall or base surface 51, a ramp surface 52 that is positioned at an oblique angle to the base wall 51, a back wall 53, and side walls 54. In this embodiment, the base wall 51 and the ramp surface 52 meet at an oblique angle to form an apex 55, and the back wall 53 is positioned opposite the apex 55 and approximately perpendicular to the ramp surface 52. The side walls 54 in this embodiment are triangular in shape and join at approximately perpendicular angles to the base wall 51, the ramp surface 52, and the back wall 53. In this embodiment, the surfaces 51, 52, 53, 54 of the wedge body 56 are all approximately planar when not subjected to stress, but in other embodiments, one or more of the surfaces 51, 52, 53, 54 may be curved or rounded. Any of the edges between the surfaces 51, 52, 53, 54 of the wedge body 56 may likewise be curved or rounded, including the apex 55.

The wedge body 56 in this embodiment is at least somewhat compressible, in order to provide greater patient comfort and ease of use. Any appropriate compressible material may be used for the wedge body 56, including various polymer foam materials, such as a polyethylene and/or polyether foam. A particular compressible material may be selected for its specific firmness and/or compressibility, and in one embodiment, the wedge body 56 is made of a foam that has relatively uniform compressibility.

The wedge 50 is configured to be positioned under the sheet 20 and the patient, to position the patient at an angle, as described in greater detail below. In this position, the base wall 51 of the wedge 50 faces downward and engages or confronts the supporting surface 16 of the bed 12, and the ramp surface 52 faces toward the sheet 20 and the patient and partially supports at least a portion of the weight of the patient. The angle of the apex 55 between the base wall 51 and the ramp surface 52 influences the angle at which the patient is positioned when the wedge 50 is used. In one embodiment, the angle between the base wall 51 and the ramp surface 52 may be up to 45°, or between 15° and 35° in another embodiment, or about 30° in a further embodiment. Positioning a patient at an angle of approximately 30° is clinically recommended, and thus, a wedge 50 having an angle of approximately 30° may be the most effective for use in positioning most immobile patients. The wedge 50 may be constructed with a different angle as desired in other embodiments. It is understood that the sheet 20 may be usable without the wedges 50, or with another type of wedge, including any commercially available wedges, or with pillows in a traditional manner. For example, the sheet 20 may be usable with a single wedge 50 having a greater length, or a number of smaller wedges 50, rather than two wedges 50, in one embodiment. As another example, two wedges 50 may be connected together by a narrow bridge section or similar structure in another embodiment. It is also understood that the wedge(s) 50 may have utility for positioning a patient independently and apart from the sheet 20 or other components of the system 10, and may be used in different positions and locations than those described and illustrated herein.

In the embodiment illustrated in FIGS. 4-5, the wedge 50 has a high-friction or gripping material 57 positioned on the base wall 51 and a low-friction or sliding material 58 positioned on the ramp surface 52. The high-friction material 57 and the low-friction material 58 may be any material described above with respect to the sheet 20, and in one embodiment, the high-friction material 57 of the wedge 50 is a high-friction foam material, and the low-friction material 58 of the wedge 50 may be the same as the low-friction material 25 of the sheet 20. The high-friction foam material may be an open-cell polyurethane foam in one embodiment. In another embodiment, the high-friction material 57 of the wedge 50 may be the same as the high-friction material 24 of the sheet 20. The materials 57, 58 are connected to the wedge body 56 using an adhesive in the embodiment shown in FIGS. 1-6, and other connection techniques can be used in other embodiments. In this embodiment, the high-friction material 57 resists sliding of the wedge 50 along the supporting surface 16 of the bed 12 once in position under the patient, and the low-friction material 58 eases insertion of the wedge under the sheet 20 and the patient (over or beneath a bed sheet 15) and eases movement of the patient up the ramp surface 52 as described below and shown in FIG. 10*b*. As shown in FIG. 5, the low-friction material 58 is wrapped partially around the apex 55 in this embodiment, in order to ease insertion of the wedge 50 and resist separation or delamination of the materials 57, 58 from the wedge body 56 upon inserting the wedge 50.

Figure 7A:
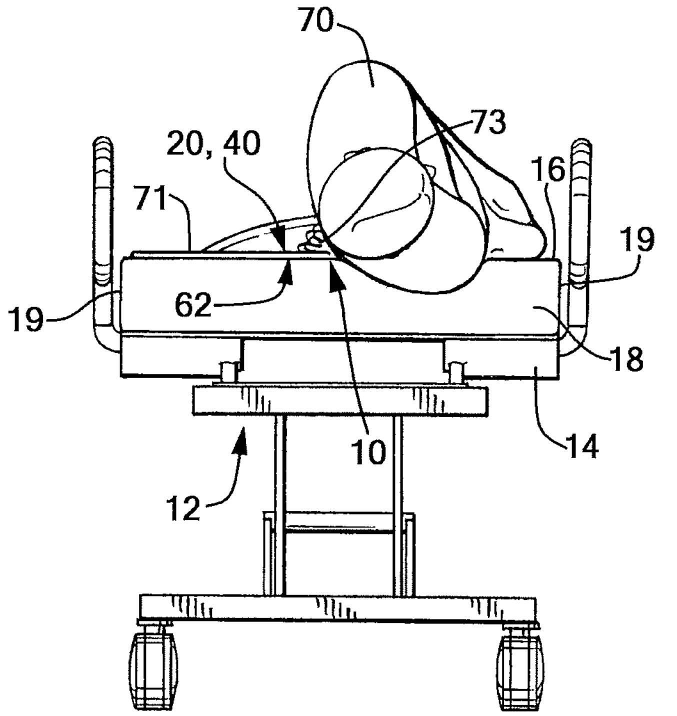
FIGS. 7*a-d* are a sequential series of views illustrating a method of placing the flexible sheet and an absorbent pad of the system of FIG. 1 on a bed.

All or some of the components of the system 10 can be provided in a kit, which may be in a pre-packaged arrangement, as described in U.S. patent application Ser. No. 13/014,497, published as U.S. Patent Application Publication No. 2012/0186012, and Ser. No. 13/014,500, published as U.S. Patent Application Publication No. 2012/0186587, which are incorporated by reference herein. For example, the sheet 20 and the pad 40 may be provided in a pre-folded arrangement or assembly, with the pad 40 positioned in confronting relation with the top surface 21 of the sheet 20, in approximately the same position that they would be positioned in use, and the sheet 20 and pad 40 can be pre-folded to form a pre-folded assembly 62, as illustrated in FIG. 7*a*. The pre-folded assembly 62 can be unfolded when placed beneath a patient, as shown in FIGS. 7*a-d*. It is understood that different folding patterns can be used. The pre-folded sheet 20 and pad 40 can then be unfolded together on the bed 12, as described below, in order to facilitate use of the system 10. Additionally, the sheet 20 and the pad 40 can be packaged together, by wrapping with a packaging material to form a package, and may be placed in the pre-folded assembly 62 before packaging. The one or more wedges 50 may also be included in the package, in one embodiment. Other packaging arrangements may be used in other embodiments.

Exemplary embodiments of methods for utilizing the system 10 are illustrated in FIGS. 7-9. FIGS. 7*a*-*d* illustrate an example embodiment of a method for placing the sheet 20 and pad 40 under a patient 70, which utilizes a pre-folded assembly 62 of the sheet 20 and pad 40. The method is used with a patient 70 lying on a bed 12 as described above, and begins with the sheet 20 and pad 40 unfolded length-wise in a partially-folded configuration. As shown in FIG. 7*a*, the patient 70 is rolled to one side, and the pre-folded assembly 62 is placed proximate the patient 70, so that a first side 71 of the assembly 62 is ready for unfolding, and the second side 73 is bunched under and against the back of the patient 70. The sheet 20 and pad 40 should be properly positioned at this time, to avoid the necessity of properly positioning the sheet 20 and pad 40 after the patient 70 is lying on top of them. In this embodiment, the sheet 20 is properly positioned when the positioning marker 84 is positioned near the head 13 of the bed 12 and approximately aligned with the shoulders of the patient 70, with the patient 70 positioned with his/her sacral area at the joint 72 where the bed 12 inclines (see FIG. 7*d*). In another embodiment, the sheet 20 may have another type of positioning indicator (not shown), such as a mark that is configured to be aligned with a marker (not shown) on the bed 12, which marker may be aligned with where the patient's sacral area should be positioned, such as at the joint 72 in the bed 12. The pad 40 is properly positioned in the pre-folded assembly 62, but may require positioning relative to the sheet 20 if the pad 40 is instead provided separately.

Figure 7B:
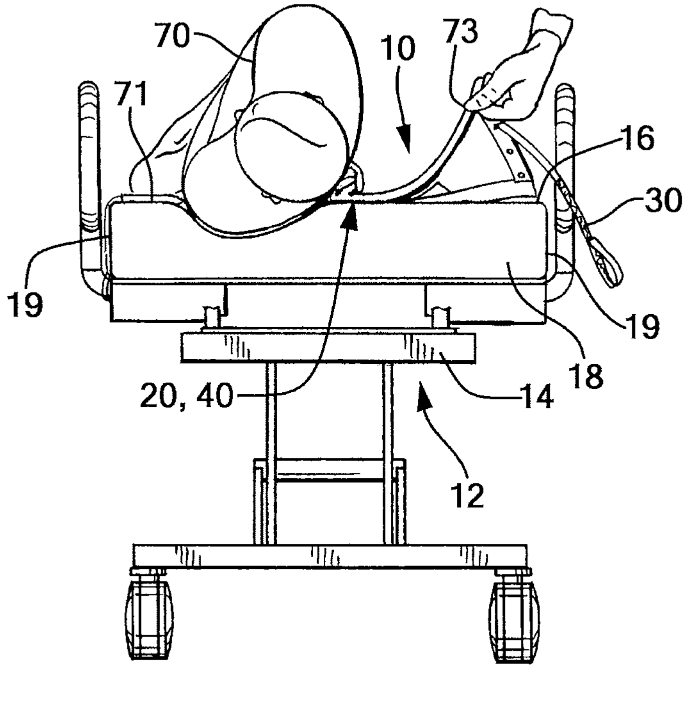
Figure 7C:
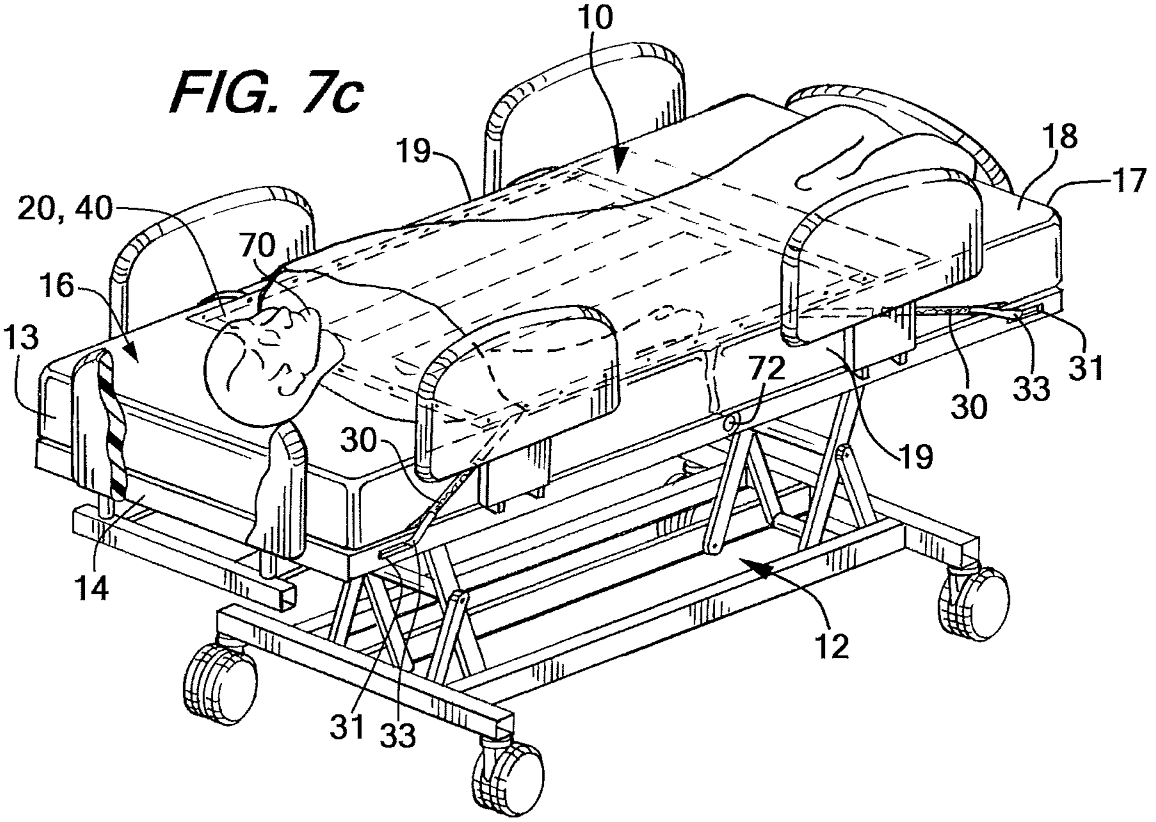
Figure 7D:
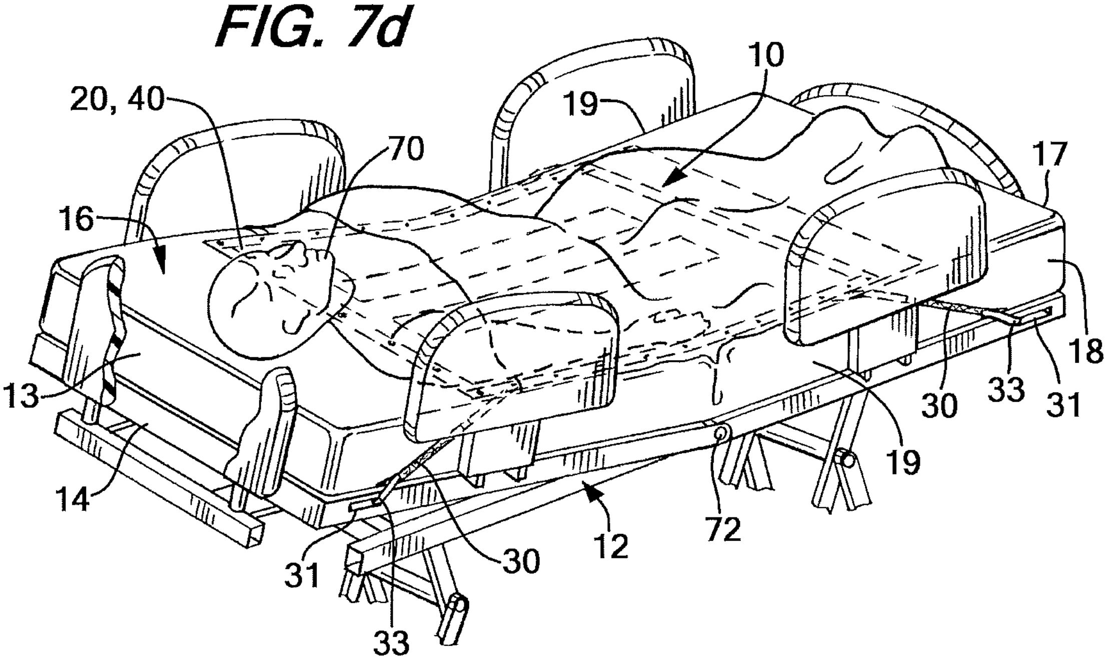

After positioning the second side 73 of the sheet 20 and pad 40 under or proximate the patient's back, the first side 71 of the sheet 20 and pad 40 assembly 62 (on the left in FIGS. 7*a*-*b*) is unfolded onto the bed 12. This creates a folded portion that is bunched under the patient 70 and an unfolded portion that is unfolded on the bed 12. The patient 70 is then rolled in the opposite direction, so that the second side 73 of the sheet 20 and pad 40 can be unfolded on the bed 12, as shown in FIG. 7*b*. The sheet 20 and pad 40 may be provided in a folded arrangement where the first and second sides 71, 73 of the sheet 20 and pad 40 can be unfolded away from the center. The patient 70 can then be rolled onto his/her back on top of the sheet 20 and pad 40, and the tether straps 30 can be connected to the bed 12, as described above. The patient 70 may be moved slightly to ensure proper positioning before connecting the straps 30, such as moving the patient 70 upward or toward the head of the bed 12, which can be accomplished by sliding the sheet 20 using the handles 28. After connection of the straps 30, the bed 12 can then be inclined if desired. The method illustrated in FIGS. 7*a*-*d* typically requires two or more caregivers for performance, but is less physically stressful and time consuming for the caregivers than existing methods.

Figures 8A, 8B, 8C, 8D:
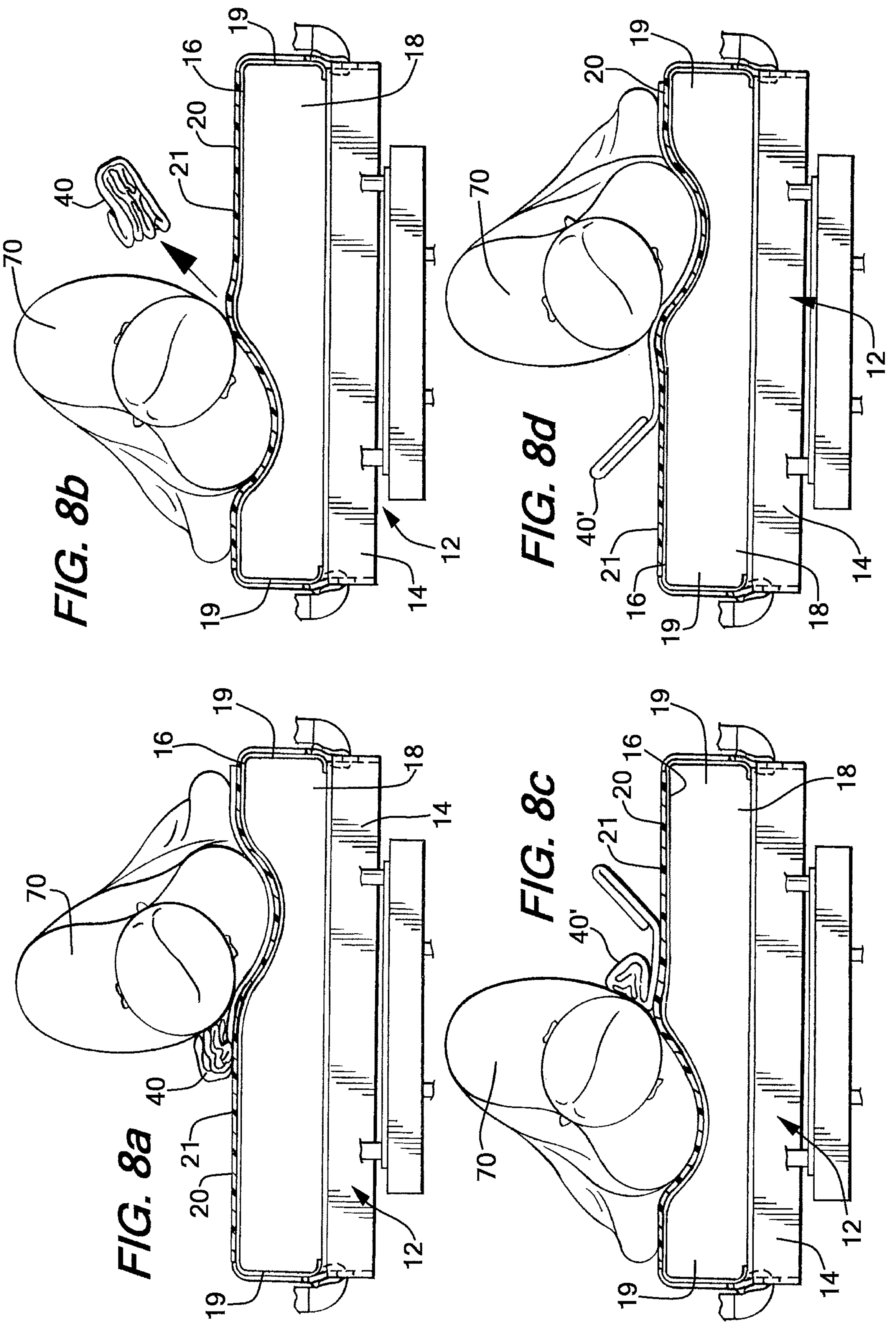
FIGS. 8*a-d* are a sequential series of views illustrating a method of removing and replacing the absorbent pad of FIGS. 7*a-d* on the bed.

FIGS. 8*a*-*d* illustrate an example embodiment of a method for removing and replacing the pad 40, while the sheet 20 remains under the patient 70. The method is used with a patient 70 lying on a bed 12 as described above. As shown in FIG. 8*a*, the patient 70 is first rolled to one side, and the uncovered portion of the pad 40 can be rolled or folded up. Then, as shown in FIG. 8*b*, the patient 70 can be rolled the opposite direction, and the pad 40 can be removed. A new pad 40' can then be positioned under the patient and partially unfolded, similarly to the unfolding of the pre-folded assembly 62, as shown in FIG. 8*c*. Next, the patient 70 is rolled again to allow for complete unfolding of the pad 40', as shown in FIG. 8*d*, after which the patient 70 can be returned to his/her back. In one embodiment, the new pad 40' can be unrolled immediately following the rolling up of the old pad 40, before the patient is turned, thus requiring the patient 70 to only be turned two times instead of three. The method illustrated in FIGS. 8*a*-*d* typically requires two caregivers for performance, but is less physically stressful and time consuming for the caregivers than existing methods.

FIGS. 9*a*-*c* illustrate an example embodiment of a method for placing the patient in an angled resting position by placing one or more support devices at least partially under the patient 70. In the method illustrated in FIGS. 9*a*-*c*, the support device(s) are in the form of two wedges 50 as described above, but one or more different support devices may be used in another embodiment, such as a single wedge, one or more pillows, etc. The method is used with a patient 70 lying on a bed 12 as described above, having a bed sheet 15 on the supporting surface 16, with the sheet 20 and pad 40 of the system 10 lying on top of the bed sheet 15, with the straps 30 connected to the bed 12, and the patient 70 lying on the pad 40. In this embodiment, the wedges 50 are positioned under the bed sheet 15 (shown as a fitted sheet), so that the bed sheet 15 is between the ramp surface 52 of the wedge 50 and the sheet 20, and the base wall 51 of the wedge 50 is in contact with the mattress 18. In another embodiment, the wedges 50 may be positioned directly under the sheet 20 and over the bed sheet 15, to be in contact with the bottom surface 22 of the sheet 20. It is understood that no bed sheet 15 or other cover for the mattress 18 may be present in some embodiments, in which case the wedges 50 can be placed directly under the sheet 20. As shown in FIG. 9*a*, the edge of the bed sheet 15 and the edge 23 of the sheet 20 are lifted, and the wedges 50 are inserted from the side of the bed 12 under the bed sheet 15 and the sheet 20 toward the patient 70. At this point, at least the apex 55 of each wedge 50 may be pushed toward, next to, or at least partially under the patient 70. The low friction material 58 of the wedge 50 can facilitate such insertion. In one embodiment, the wedges 50 should be aligned so that the wedges are spaced apart with one wedge 50 positioned at the upper body of the patient 70 and the other wedge 50 positioned at the lower body of the patient 70, with the patient's sacral area positioned in the space between the wedges 50. It has been shown that positioning the wedges 50 in this arrangement can result in lower pressure in the sacral area, which can reduce the occurrence of pressure ulcers in the patient 70. The greatest comfort was reported when the wedges 50 were positioned approximately 10 cm apart.

Once the wedges 50 have been inserted, the user 74 (such as a caregiver) can pull the patient 70 toward the wedge 70 and toward the user 74, such as by gripping the handles 28 on the sheet 20, as shown in FIG. 9*b*. This moves the proximate edge of the sheet 20 toward the back walls 53 of the wedges 50 and toward the user 74, and slides the patient 70 and at least a portion of the sheet 20 up the ramp surface 52, such that the ramp surface 52 partially supports the patient 70 to cause the patient 70 to lie in an angled position. During this pulling motion, the low friction materials 25, 58 on the sheet 20 and the wedges 50 provide ease of motion, the high friction surface 57 of the wedge 50 resists movement of the wedge 50, and the high friction surface 24 of the sheet 20 resists movement of the pad 40 and/or the patient 70 with respect to the sheet 20. Additionally, the elastic portions 32 of the straps 30 permit sufficient freedom of movement of the sheet 20 to move the sheet 20 and the patient 70 onto the wedges 50. FIG. 9*c* illustrates the positioning of the sheet 20, the pad 40, the wedge 50, the bed sheet 15, and the patient 70 after the action shown in FIG. 9*b*.

When the patient 70 is to be returned to lying on his/her back, the wedges 50 can be removed from under the patient 70. The sheet 20 may be pulled in the opposite direction in order to facilitate removal of the wedges 50 and/or position the patient 70 closer to the center of the bed 12. The patient can be turned in the opposite direction by inserting the wedges 50 under the opposite side of the bed sheet 15, from the opposite side of the bed 12, and pulling the sheet 20 in the opposite direction to move the patient 70 up the ramp surfaces 52 of the wedges 50, in the same manner described above.

As described above, in some embodiments, the wedges 50 may have an angle of up to approximately 45°, or from approximately 15-35°, or approximately 30°. Thus, when these embodiments of wedges 50 are used in connection with the method as shown in FIGS. 9*a-c*, the patient 70 need not be rotated or angled more than 45°, 35°, or 30°, depending on the wedge 50 configuration. The degree of rotation can be determined by the rotation or angle from the horizontal (supine) position of a line extending through the shoulders of the patient 70. Existing methods of turning and positioning patients to relieve sacral pressure often require rolling a patient to 90° or more to insert pillows or other supporting devices underneath. Rolling patients to these great angles can cause stress and destabilize some patients, particularly in patients with critical illnesses or injuries, and some critical patients cannot be rolled to such great angles, making turning of the patient difficult. Accordingly, the system 10 and method described above can have a positive effect on patient health and comfort. Additionally, the angled nature of the wedges 50 can allow for more accurate positioning of the patient 70 to a given resting angle, as compared to existing, imprecise techniques such as using pillows for support. For example, the recommended resting angle of 30° can be more successfully achieved with a wedge 50 that has an angle of approximately 30°, and the high friction material 57 on the base wall 51 resists sliding of the wedge 50 and aids in maintaining the same turning angle. Pillows, as currently used, provide inconsistent support and can slip out from underneath a patient more easily.

Research has shown that the use of the system 10 and methods described above can result in a significantly decreased number of pressure ulcers in patients. The system 10 reduces pressure ulcers in a variety of manners, including reducing pressure on sensitive areas, reducing shearing and friction on the patient's skin, and managing heat and moisture at the patient's skin. The system 10 can reduce pressure on the patient's skin by facilitating frequent turning of the patient and providing consistent support for accurate resting angles for the patient upon turning. The system 10 can reduce friction and shearing on the patient's skin by resisting sliding of the patient along the bed 12, including resisting sliding of the patient downward after the head 13 of the bed 12 is inclined, as well as by permitting the patient to be moved by sliding the sheet 20 against the bed 12 instead of sliding the patient. The system 10 can provide effective heat and moisture management for the patient by the use of the absorbent body pad. The breathable properties of the sheet 20 and pad 40, are particularly beneficial when used in conjunction with an LAL bed system. When used properly, pressure ulcers can be further reduced or eliminated. For example, in trials where a similar system was used for 1000 patients, no pressure ulcers were reported, whereas typically about 7% to 20% of patients develop pressure ulcers. Subsequent testing has confirmed such benefits in reducing pressure ulcers.

The use of the system 10 and methods described above can also have beneficial effects for nurses or other caregivers who turn and position patients. Such caregivers frequently report injuries to the hands, wrists, shoulders, back, and other areas that are incurred due to the weight of patients they are moving. Use of the system 10, including the sheet 20 and the wedges 50, can reduce the strain on caregivers when turning and positioning patients. For example, existing methods for turning and positioning a patient 70, such as methods including the use of a folded-up bed sheet for moving the patient 70, typically utilize lifting and rolling to move the patient 70, rather than sliding. Protocols for these existing techniques encourage lifting to move the patient and actively discourage sliding the patient, as sliding the patient using existing systems and apparatuses can cause friction and shearing on the patient's skin. The ease of motion and reduction in shearing and friction forces on the patient 70 provided by the system 10 allows sliding of the patient 70, which greatly reduces stress and fatigue on caregivers. Studies with respect to the system described in U.S. patent application Ser. No. 13/014,497 and U.S. patent application Ser. No. 13/014,500 reported an 85-88% reduction in employee injury claims through use of the system. Similar results are possible with the system as described herein.

As another example, the act of pulling and sliding the sheet 20 and patient 70 toward the caregiver 74 to turn the patient 70 to an angled position, as shown in FIG. 9*b*, creates an ergonomically favorable position for movement, which does not put excessive stress on the caregiver 74. In particular, the caregiver 74 does not need to lift the patient 70 at all, and may turn the patient 70 simply by pulling on the handles 28 to allow the mechanical advantage of the ramp surface 52 to turn the patient 70. Additionally, it allows the patient 70 to be turned between the angled and non-angled positions (e.g. 30°-0°-30°) by only a single caregiver. Prior methods often require two or more caregivers. Research data indicates that utilizing the system 10, including the sheet 20, the pad 40, and the wedges 50 as shown in FIG. 9 requires between 54% and 84% less work (depending on the type of bed and material of the bed sheet), with an average of 71% less work, to turn the patient, as compared to the current standard technique of sliding the patient 70 to the middle of the bed on a folded flat sheet, rolling the patient 70, inserting pillows under the patient 70, and then rolling the patient 70 back onto the pillows. For subjects weighing approximately 136 lb., between 43% and 66% less work (average 57% less) was required. For subjects weighing approximately 200 lb., between 61 and 78% less work (average 6% less) was required. For subjects weighing approximately 336 lb., between 55% and 94% less work (average 79% less) was required. Additional research data indicates that 93% of over 100 nurses surveyed reported greater compliance with Q2 turning protocols when using a low friction sheet and wedges as described in parents U.S. patent application Ser. No. 13/014,497 and U.S. patent application Ser. No. 13/014,500. This high level of increased compliance was unexpected, and illustrates the advantages of the system and methods described above for caregivers in ergonomics, time savings, and other areas. Further research, in the form of anecdotal evidence, indicates that using the system makes turning and positioning the patient easier and results in significantly less stress on the caregiver, to an unexpectedly successful level. Similar or better levels of success are possible with the system 10 described herein. The sliding members 80 may further reduce such stress. The anecdotal evidence also indicated that strong compliance with turning protocols was more likely while using the system 10, reinforcing the research data previously mentioned.

As further examples, the low friction material 25 on the bottom surface 22 of the sheet 20 facilitates all movement of the patient 70 on the bed 12, and the sliding members 80 further facilitate lateral movement of the patient 70, such as when moving the patient 70 up on the wedges 50 or other supporting device. Testing indicates that the peak force required for initial movement of the patient is significantly and noticeably reduced through use of the sliding members 80 as shown in FIGS. 1-6 and 10. In one example, an improvement of 25% was recorded. Additionally, the high friction material 24 on the sheet 20 reduces movement of the body pad 40, and may also reduce movement of the patient 70, thereby reducing the necessity for the caregiver to reposition the patient 70. The use of the tether straps 30 more securely positions the sheet 20 on the bed 12 and also reduces or eliminates sliding of the patient 70 when the bed is inclined, as well as resists over-boosting of the patient 70 if some downward sliding does occur. The high-friction foam material 57 on the wedges 50 is more durable and retains its frictional properties over longer periods of time as compared to most high-friction materials.

Still other benefits and advantages over existing technology are provided by the system 10 and methods described herein, and those skilled in the art will recognize such benefits and advantages.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," etc., as used herein, are intended for illustrative purposes only and do not limit the embodiments in any way. Additionally, the term "plurality," as used herein, indicates any number greater than one, either disjunctively or conjunctively, as necessary, up to an infinite number. Further, "providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention and the scope of protection is only limited by the scope of the accompanying Claims.

What is claimed is:

1. A system for use with a bed having a supporting surface, the system comprising:

a sheet having a bottom surface adapted to be placed above the supporting surface of the bed, and a top surface opposite the bottom surface, wherein the sheet comprises:

a first material forming at least a continuous central portion of the bottom surface and at least a portion of the top surface, the first material having a first coefficient of friction, and the sheet further comprises a first edge, a second edge, a third edge, and a fourth edge, a second material forming a continuous central portion of the top surface being a majority of the top surface, the second material is or includes a coating, the second material having a second coefficient of friction being higher than the first coefficient of friction, and a third material coupled to the bottom surface of the sheet and extending along the first edge of the sheet, the second edge of the sheet, and the third edge of the sheet, the second material recessed from the first, second, third and fourth edges; and an absorbent pad for laying on the top surface of the sheet without the use of releasable connectors between the sheet and the absorbent pad, wherein a bottom surface of the absorbent pad comprises a first continuous bottom portion having a surface treatment and a second bottom portion, wherein the first continuous bottom portion defines an area that is larger than the second bottom portion, and wherein the first continuous bottom portion is configured to interact with the coating to resist sliding of the absorbent pad.

2. The system of claim 1, wherein a coefficient of friction between the top surface of the sheet and the bottom surface of the absorbent pad is greater than a coefficient of friction between the bottom surface of the sheet and the supporting surface of the bed.

3. The system of claim 1, further comprising a wedge comprising a base wall, a ramp surface, and a back wall, the ramp surface being positioned at an angle to the base wall, wherein the wedge is configured to be positioned under the sheet such that the base wall confronts the supporting surface of the bed and the ramp surface confronts the bottom surface of the sheet.

4. The system of claim 3, further comprising a second wedge comprising a base wall, a ramp surface, and a back wall, the ramp surface being positioned at an angle to the base wall, wherein the wedge is configured to be positioned under the sheet such that the base wall confronts the supporting surface of the bed and the ramp surface confronts the bottom surface of the sheet.

5. The system of claim 1, further comprising at least one strap extending from the sheet.

6. The system of claim 1, wherein:

the absorbent pad has a first width;

the sheet has a second width; and the first width is equal to the second width.

7. The system of claim 1, wherein:

the absorbent pad has a first size;

the sheet has a second size; and the first size is the same as the second size.

8. The system of claim 1, wherein:

the absorbent pad is formed of a fourth material; and the fourth material is different than the first material, the second material, and the third material.

9. The system of claim 1, wherein the absorbent pad is formed of an absorbent material configured to absorb a fluid.

10. The system of claim 1, wherein a top surface of the absorbent pad includes a lint pad.

11. The system of claim 1, wherein the absorbent pad is formed of a breathable material configured to permit the flow of moisture vapor through the absorbent pad.

12. The system of claim 1, wherein the absorbent pad is formed of a breathable material configured to permit the flow of air through the absorbent pad.

13. The system of claim 1, wherein the absorbent pad is formed of a breathable material configured to permit the flow of heat through the absorbent pad.

14. The system of claim 1, wherein the sheet further comprises one or more sliding members extending between the first edge and the second edge along the bottom surface of the sheet, the one or more sliding members positioned proximate a center of the sheet, the one or more sliding members having a third coefficient of friction different from the first coefficient of friction and the second coefficient of friction.

15. The system of claim 1, wherein the second coefficient of friction is 8 to 10 times greater than the first coefficient of friction.

16. The system of claim 1, wherein the first material includes a second coating.

* * * * *